(12) United States Patent
Li et al.

(10) Patent No.: US 12,146,374 B2
(45) Date of Patent: Nov. 19, 2024

(54) ACTIVE INTELLIGENT WELLBORE PRESSURE CONTROL SYSTEM

(71) Applicant: SOUTHWEST PETROLEUM UNIVERSITY, Chengdu (CN)

(72) Inventors: Hongtao Li, Chengdu (CN); Gao Li, Chengdu (CN); Jun Jiang, Chengdu (CN); Wenhe Xia, Chengdu (CN); Xu Yang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/159,192

(22) Filed: Jan. 25, 2023

(65) Prior Publication Data
US 2023/0235636 A1    Jul. 27, 2023

(30) Foreign Application Priority Data

Jan. 25, 2022 (CN) .......................... 202210084918.3

(51) Int. Cl.
| | |
|---|---|
| *E21B 21/08* | (2006.01) |
| *E21B 21/06* | (2006.01) |
| *E21B 21/10* | (2006.01) |
| *E21B 33/06* | (2006.01) |
| *G05D 16/18* | (2006.01) |

(52) U.S. Cl.
CPC ............ *E21B 21/08* (2013.01); *E21B 21/106* (2013.01); *E21B 33/06* (2013.01); *G05D 16/18* (2013.01); *E21B 21/065* (2013.01); *E21B 21/067* (2013.01)

(58) Field of Classification Search
CPC ...... E21B 21/08; E21B 21/082; E21B 21/085; E21B 21/106; E21B 33/06; E21B 21/065; E21B 21/067; G05D 16/18
See application file for complete search history.

(56) References Cited

U.S. PATENT DOCUMENTS

| | | | |
|---|---|---|---|
| 11,506,047 B2 * | 11/2022 | Gooneratne | ............ E21B 44/00 |
| 2003/0075361 A1 * | 4/2003 | Terry | .................... E21B 17/206 |
| | | | 175/171 |

(Continued)

*Primary Examiner* — Shane Bomar
(74) *Attorney, Agent, or Firm* — MUNCY, GEISSLER, OLDS & LOWE, P.C.

(57) ABSTRACT

The present invention discloses an active intelligent wellbore pressure control system, which includes a ground multi-parameter online monitoring system (86), a rotary blowout preventer (1), a wellhead back pressure compensation manifold, an automatic plugging material filling device (62), a drilling device, an MPD intelligent control system (87), a remote monitoring and control system (88), and a high-precision hydraulic calculation system (105). The present invention provides a wellbore pressure control thought of "plugging and control integration", improves the pressure resistance of a formation by circularly plugging while drilling, realizes active control of a wellbore pressure, effectively broadens a "drilling safety density window" of the formation, reduces the requirements on the pressure control precision of a wellbore pressure control device, solves the problem that a conventional MPD technology cannot deal with the situation that the "drilling safety density window" of the formation is extremely narrow or even zero, and expands the application range of the MPD technology.

7 Claims, 6 Drawing Sheets

(56) References Cited

U.S. PATENT DOCUMENTS

| | | | |
|---|---|---|---|
| 2016/0097270 A1* | 4/2016 | Pobedinski | E21B 21/08 |
| | | | 700/275 |
| 2017/0096889 A1* | 4/2017 | Blanckaert | E21B 44/00 |
| 2019/0169986 A1* | 6/2019 | Storm, Jr. | G01V 11/00 |
| 2020/0190967 A1* | 6/2020 | Gooneratne | G05B 19/4155 |
| 2021/0372276 A1* | 12/2021 | Steele | H04B 10/25891 |
| 2023/0235635 A1* | 7/2023 | Li | E21B 33/06 |
| | | | 175/25 |

* cited by examiner

To drilling pump set

To the data integration and processing system of the ground multi-parameter online monitoring system To MPD intelligent control platform

ACTIVE INTELLIGENT WELLBORE PRESSURE CONTROL SYSTEM

TECHNICAL FIELD

The present invention relates to the field of drilling for oil and natural gas exploration and development, in particular to an active intelligent wellbore pressure control system.

BACKGROUND ART

With the continuous deepening of oil and gas exploration and development, the field of exploration and development is gradually turning to complex formations such as deep layers, deep water and unconventional formations. Generally, a "safety density window" of complex formations is relatively narrow, and a series of complex drilling problems such as well kicking, well leakage, and jamming are prone to occur when conventional drilling techniques are applied, and have become the technical bottlenecks that seriously affect and restrict the oil and gas exploration and development in complex formations.

A managed pressure drilling (MPD) technology is a new drilling technology developed in recent years. Its core is to regulate a wellhead back pressure in real time through a corresponding equipment system, so as to indirectly control a bottom hole pressure and keep it always in a "drilling safety density window", thereby effectively preventing and controlling well leakage and overflow, avoiding downhole complex situations and greatly shortening the production time. The MPD technology has become the most effective technical means to solve the problem of wellbore pressure control in complex formation drilling. Since the inception of the MPD technology, after years of development, the technical system has become more and more perfect, and the control accuracy of a wellbore pressure has continued to improve. The control accuracy of a bottom hole pressure of a developed fine MPD system can reach ±0.35 MPa, which has become a new weapon of safe and efficient drilling devices, and related devices have also been localized.

At present, the fine MPD technology has been applied on a large scale in the field and achieved good application results, but the existing fine MPD technology still has the following problems.

The existing fine MPD system mainly includes a rotary blowout preventer, a ground automatic throttle manifold, a back pressure compensation device, a downhole pressure while drilling (PWD) testing system, ground control software, etc., as shown in FIG. 1. A ground throttle control system consists of various gate valves, hydraulically controlled throttle valves, main throttle manifolds, auxiliary throttle manifolds, Coriolis flowmeters, pressure sensors, hydraulically controlled throttle control consoles, control boxes, etc. The back pressure compensation device consists of an electric triplex plunger pump, an AC motor, a water supply pipeline, a water drainage pipeline, a Coriolis flowmeter, etc. The ground automatic throttle manifold and the back pressure compensation device are complex in structure. The overall structure adopts a skid-mounted structure, coupled with a supporting numerical control room, etc. The whole set of fine MPD system is quite large, and the equipment occupies a large area. In addition, the whole set of equipment cannot be divided into independent units used alone, such that the whole set of equipment must be installed on a well site, which imposes more stringent requirements on the size of the well site and severely limits the popularization and application of the fine MPD technologies in offshore drilling, mountain drilling and other scenarios.

SUMMARY OF THE INVENTION

An object of the present invention is to overcome the above problems existing in the existing fine MPD system, and to provide an active intelligent wellbore pressure control system.

In order to achieve the above object, the present invention provides an active intelligent wellbore pressure control system, comprising a ground multi-parameter online monitoring system, a rotary blowout preventer, a wellhead back pressure compensation manifold, an automatic plugging material filling device, a drilling device, an MPD intelligent control system, a remote monitoring and control system, and a high-precision hydraulic calculation system, wherein:

the ground multi-parameter online monitoring system is provided with a port connected to a logging system, and connected to the remote monitoring and control system through communication network equipment, the ground multi-parameter online monitoring system is connected with the high-precision hydraulic calculation system and the MPD intelligent control system, and the ground multi-parameter online monitoring system provides core basic data for the remote intelligent active control of a wellbore pressure in oil and gas drilling; and the upper end of the drilling device is connected to the wellhead back pressure compensation manifold; the wellhead back pressure compensation manifold is connected to one end of the automatic plugging material filling device through a slurry pump, and the other end of the automatic plugging material filling device is connected to a slurry tank; the slurry tank is connected to a vibrating screen through a pipeline; a slurry pool is disposed below the vibrating screen; one end of the wellhead back pressure compensation manifold extends to the upper side of the slurry pool; one end of the wellhead back pressure compensation manifold is connected to a gas-liquid separator through a pipeline; a combustion pool is connected to the upper side of the gas-liquid separator; the lower side of the gas-liquid separator is disposed above the vibrating screen; and the rotary blowout preventer is disposed above the drilling device.

Further, the wellhead back pressure compensation manifold comprises a throttling and diversion manifold system, a four-way joint $SC_1$, a branch VII, a branch VI and a slurry pump; the throttling and diversion manifold system is provided with a tee joint $T_7$; the branch VII is connected to the throttling and diversion manifold system and the four-way joint $SC_1$ through the tee joint $T_7$, and the branch VI is connected to the slurry pump through the four-way joint $SC_1$; one end of the four-way joint $SC_1$ is connected to a water hose through a pipeline, the water hose is connected to the rotary blowout preventer, and an automatic throttle control system and a manual gate valve $SV_{28}$ are disposed on the pipeline; the throttling and diversion manifold system comprises a PLC controller, electronically controlled throttle valves, gate valves, a branch I, a branch II, a branch III, a branch IV, and a branch V; the branch I, the branch II and the branch III are connected through a tee joint $T_6$; the branch IV is connected to the branch II through a tee joint $T_7$; the branch V is connected to the branch III through a tee joint $T_5$; the electronically controlled throttle valves and the gate valves are mounted in the throttling and diversion manifold system respectively; the gate valves comprise a manual gate valve $SV_3$, a manual gate valve $SV_8$, a manual gate valve $SV_9$, a manual gate valve $SV_{10}$, a manual gate valve $SV_{12}$, a manual gate valve $SV_{13}$, and a manual gate valve $SV_{15}$; the electronically controlled throttle valves comprise an electronically controlled throttle valve $V_1$, an electronically controlled throttle valve $V_2$ and an electronically controlled throttle valve $V_3$; the PLC controller is connected to the electronically controlled throttle valve $V_1$, the electronically controlled throttle valve $V_2$ and the electronically controlled throttle valve $V_3$ respectively;

a pressure control manifold flowmeter $F_3$, a manual gate valve $SV_{15}$ and a pressure control manifold pressure sensor $P_8$ are mounted on the branch I; the manual gate valve $SV_{15}$ is connected with a well control throttle manifold through a tee joint $T_8$; the ground multi-parameter online monitoring system is respectively connected to the pressure control manifold flowmeter $F_3$ and the pressure control manifold pressure sensor $P_8$;

an electrically controlled throttle valve $V_2$, a pressure control manifold flowmeter $F_2$, a manual gate valve $SV_{13}$, a pressure control manifold pressure sensor $P_4$ and a pressure control manifold pressure sensor $P_5$ are mounted on the branch II; the manual gate valve $SV_{13}$ is connected with the tee joint $T_7$; the pressure control manifold pressure sensor $P_4$ and the pressure control manifold pressure sensor $P_5$ are respectively mounted on both ends of the electrically controlled throttle valve $V_2$; the ground multi-parameter online monitoring system is respectively connected with the electrically controlled throttle valve $V_2$ and the pressure control manifold flowmeter $F_2$;

an electrically controlled throttle valve $V_1$ and a manual gate valve $SV_9$ are mounted on the branch III; a pressure control manifold pressure sensor $P_6$ and a pressure control manifold pressure sensor $P_7$ are respectively mounted on both ends of the electrically controlled throttle valve $V_1$; the ground multi-parameter online monitoring system is respectively connected with the electrically controlled throttle valve $V_1$, the pressure control manifold pressure sensor $P_6$ and the pressure control manifold pressure sensor $P_5$;

a manual gate valve $SV_3$, a manual gate valve $SV_{12}$, an electrically controlled throttle valve $V_3$, a pressure control manifold pressure sensor $P_2$ and a pressure control manifold pressure sensor $P_3$ are mounted on the branch IV; the manual gate valve $SV_3$ is connected with the well control throttle manifold through a tee joint $T_4$; the pressure control manifold pressure sensor $P_2$ and the pressure control manifold pressure sensor $P_3$ are respectively mounted on both ends of the electrically controlled throttle valve $V_3$; the ground multi-parameter online monitoring system is respectively connected with the electrically controlled throttle valve $V_3$, the pressure control manifold pressure sensor $P_2$ and the pressure control manifold pressure sensor $P_3$; and a manual gate valve $SV_8$ and a manual gate valve $SV_{10}$ are mounted on the branch V; and the manual gate valve $SV_{10}$ is connected with a gas-liquid separator through a four-way joint $SC_4$.

Further, comprising a vertical pressure sensor $P_1$, a pressure control manifold pressure sensor $P_2$, a pressure control manifold pressure sensor $P_3$, a pressure control manifold pressure sensor $P_4$, a pressure control manifold pressure sensor $P_5$, a pressure control manifold pressure sensor $P_6$, a pressure control manifold pressure sensor $P_7$, a pressure control manifold pressure sensor $P_8$, a casing pressure sensor $P_9$, a gas-liquid separator exhaust pipe pressure sensor $P_{10}$, a drilling fluid inlet flowmeter $F_1$, a drilling fluid outlet flowmeter $F_5$, a gas-liquid separator outlet pipe flowmeter $F_4$, a pressure control manifold flowmeter $F_2$ and a pressure control manifold flowmeter $F_3$ which are connected through the ground multi-parameter online monitoring system, a gas-liquid separator exhaust pipe gas flowmeter $F_6$, a graded filling device slurry injection pipeline sensor $F_7$, a mud return branch drilling fluid rheological monitoring device $R_1$, a gas-liquid separator outlet pipe drilling fluid rheological monitoring device $R_2$, and a gas-liquid separator exhaust pipe gas component monitoring device.

Further, the wellhead back pressure compensation manifold is connected to a well-killing manifold through a four-way $SC_1$, and one end of the well-killing manifold is connected to a manual gate valve $SV_{27}$ disposed above the drilling device.

Further, the drilling device consists of a drill string and a drill bit, a downhole storage-type pressure measuring device is disposed above the drill bit, and a single-gate blowout preventer, a double-gate blowout preventer, an annular blowout preventer and a rotary blowout preventer are sequentially disposed above the drill bit.

Further, the automatic plugging material filling device comprises a slurry suction pump, a filling tank, a feeder, a mixer, a filling tank electrically controlled throttle valve $V_4$, a filling control system, a filling tank flowmeter $F_7$, a slurry suction pipeline, and a slurry injection pipeline; the filling tank is mounted on the slurry tank, and is connected with the slurry tank through the slurry suction pipeline; the filling tank is connected with a water pipeline on a drilling team slurry pump through the slurry injection pipeline; the slurry suction pump is mounted on the slurry suction pipeline; the filling tank electrically controlled throttle valve $V_4$ and the filling tank flowmeter $F_7$ are respectively mounted on the slurry injection pipeline; the mixer, the feeder and the feeding control system are respectively mounted on the filling tank; and the feeding control system is respectively connected with the mixer, the feeder and the slurry suction pump, and is connected with the MPD intelligent control system through communication equipment.

Further, the high-precision drilling hydraulic calculation system comprises a steady-state calculation module and a transient calculation module:

the steady-state calculation module is configured to perform steady-state calculation on single-phase fluid or gas-liquid two-phase fluid of drilling fluid in an annulus and the drill string according to a preset steady-state calculation path to obtain steady-state drilling parameters on the preset steady-state calculation path; and the transient calculation module is configured to perform transient calculation on the gas-liquid two-phase fluid in the annulus and the drill string according to a preset transient calculation path to obtain transient drilling parameters on the preset transient calculation path.

The present invention has the following beneficial effects.

1. The present invention provides a wellbore pressure control thought of "plugging and control integration", improves the pressure resistance of a formation by circularly plugging while drilling, realizes active control of a wellbore pressure, effectively broadens the "drilling safety density window" of the formation, reduces the requirements on the pressure control precision of a wellbore pressure control device, solves the problem that a conventional MPD technology cannot copy with the situation that the "drilling safety density window" of the formation is extremely narrow or even zero, and expands the application range of the MPD technology.

2. A ground automatic throttle control system and a back pressure compensation device of a fine MPD drilling system are replaced by the ground simple throttle control manifold and the back pressure compensation manifold, such that the structure is simple, no skid-mounted device is required, the equipment occupancy area is small and the mounting is flexible. The problem that the conventional MPD system is hardly applied in scenarios having limited well site spaces such as mountain drilling and marine drilling.

3. The device of the present invention is not equipped with a downhole pressure while drilling (PWD) testing system, a Coriolis flowmeter and a special back pressure compensation device; and a downhole storage-type pressure measuring device is optional, which greatly reduces the cost of the MPD system.

4. An automatic filling device for plugging materials is used to realize automatic feeding and slurry configuration of the plugging materials.

5. The special back pressure compensation device is replaced by the drilling team slurry pump in combination with the back pressure compensation manifold, which avoids small displacement, low water feeding efficiency, easy failure and other problems, and can meet the slurry injection needs of vicious well leakage and long-term drilling, thereby achieving more stable outlet flow and more accurate control over the wellhead back pressure.

6. The electrically controlled throttle valve is adopted to replace a hydraulically controlled or pneumatically controlled throttle valve, which makes the response speed of the control system faster and the pressure control smoother.

7. The ground multi-parameter online monitoring system is used to realize online monitoring of multiple parameters, such as drilling engineering parameters and fluid, and real-time intelligent identification of drilling safety risks, so as to make the wellbore pressure control more forward-looking.

8. The MPD system of the present invention has a remote control function, and integrates drilling geological engineering research data and real-time online monitoring to achieve closed-loop intelligent control and reduce the operation risk caused by operator's misoperation.

Figure 1:
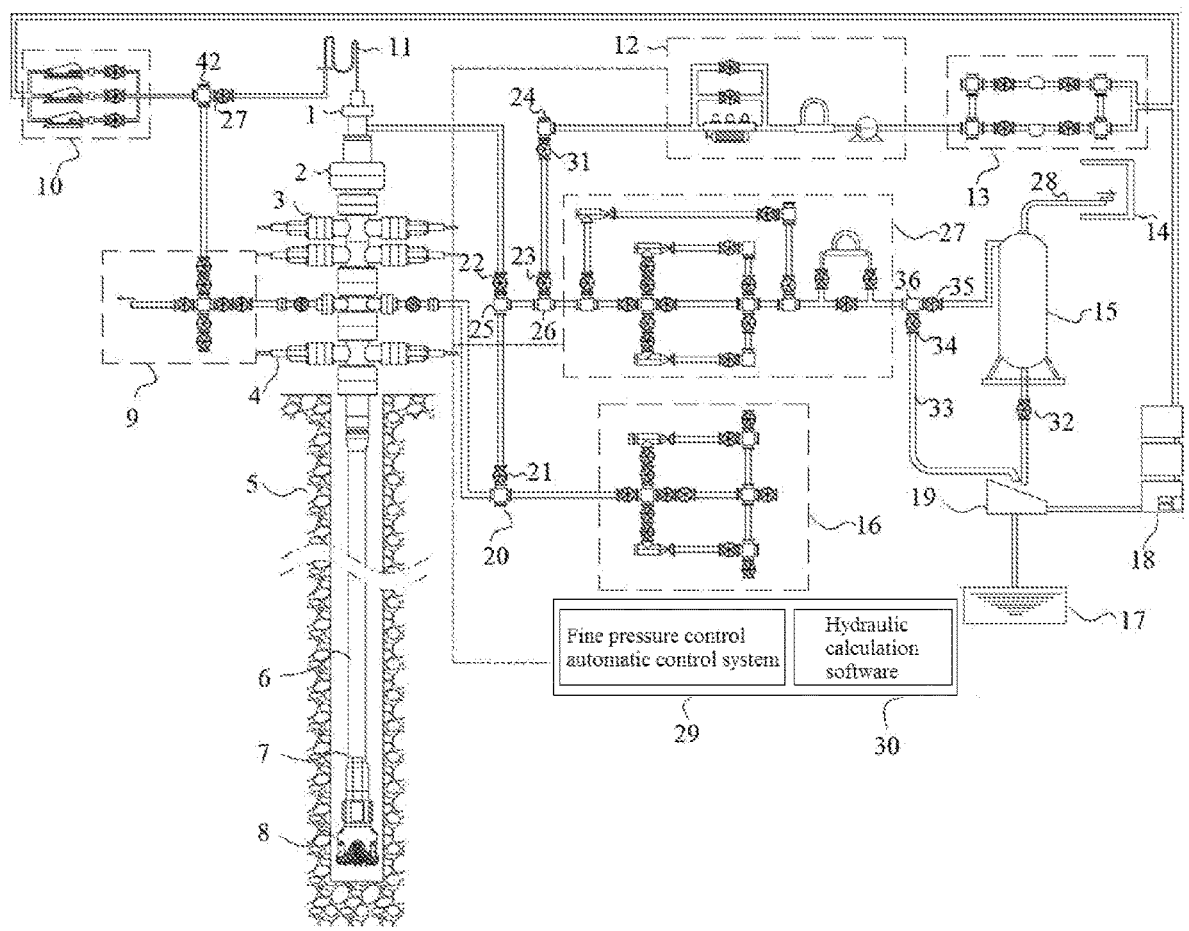
FIG. 1 is a schematic diagram of a working principle of an existing fine MPD system.

1: rotary blowout preventer; 2: annular blowout preventer; 3: double-gate blowout preventer; 4: single-gate blowout preventer; 5: well wall; 6: drill string; 7: downhole pressure while drilling (PWD); 8: drill bit; 9: kill manifold; 10: drilling team slurry pump; 11: water hose; 12: wellhead back pressure compensation manifold; 13: filter set; 14: combustion pool; 15: gas-liquid separator; 16: well control throttle manifold; 17: slurry pool; 18: slurry tank; 19: vibrating screen; 20: tee joint $T_1$; 21: manual gate valve $SV_1$; 22: manual gate valve $SV_2$; 23: manual gate valve $SV_3$; 24: tee joint $T_2$; 25: tee joint $T_3$; 26: tee joint $T_4$; 27: automatic throttle control system; 28: gas-liquid separator exhaust pipe; 29: fine MPD automatic control system; 30: drilling hydraulic calculation software; 31: manual gate valve $SV_4$; 32: manual gate valve $SV_5$; 33: slurry return branch; 34: manual gate valve $SV_6$; 35: manual gate valve $SV_7$; 36: four-way joint $SC_4$; 37: tee joint $T_5$; 38: manual gate valve $SV_8$; 39: electrically controlled throttle valve $V_1$; 40: electrically controlled throttle valve $V_2$; 41: electrically controlled throttle valve $V_3$; 42: four-way joint $SC_1$; 43: drilling fluid inlet flowmeter $F_1$; 44: vertical pressure sensor $P_1$; 45: pressure control manifold pressure sensor $P_2$; 46: pressure control manifold pressure sensor $P_3$; 47: pressure control manifold pressure sensor $P_4$; 48: pressure control manifold pressure sensor $P_5$; 49: pressure control manifold pressure sensor $P_6$; 50: pressure control manifold pressure sensor $P_7$; 51: pressure control manifold pressure sensor $P_8$; 52: casing pressure sensor $P_9$; 53: pressure control manifold flowmeter $F_2$; 54: tee joint $T_6$; 55: manual gate valve $SV_9$; 56: manual gate valve $SV_{10}$; 57: gas-liquid separator exhaust pipe gas flowmeter $F_6$; 58: gas-liquid separator exhaust pipe gas component monitoring device; 59: drilling fluid outlet flowmeter $F_5$; 60: gas-liquid separator outlet pipe flowmeter $F_4$; 61: pressure control manifold flowmeter $F_3$; 62: automatic filling device for plugging materials; 63: tee joint $T_7$; 64: manual gate valve $SV_{11}$; 65: manual gate valve $SV_{12}$; 66: manual gate valve $SV_{13}$; 67: hydraulically controlled throttle valve; 68: manual throttle valve $J_1$; 69: manual gate valve $SV_{14}$; 70: manual gate valve $SV_{15}$; 71: tee joint $T_8$; 72: manual gate valve $SV_{16}$; 73: four-way joint $SC_2$; 74: tee joint $T_9$; 75: manual gate valve $SV_{17}$; 76: manual gate valve $SV_{18}$; 77: manual gate valve $SV_{19}$; 78: manual gate valve $SV_{20}$; 79: manual gate valve $SV_{21}$; 80: manual gate valve $SV_{22}$; 81: manual gate valve $SV_{23}$; 82: four-way joint $SC_3$; 83: manual gate valve $SV_{24}$; 84: manual gate valve $SV_{25}$; 85: logging data center; 86: ground multi-parameter online monitoring system; 87: MPD intelligent control system; 88: remote monitoring and control system; 89: gas-liquid separator outlet pipe drilling fluid rheological monitoring device $R_2$; 90: slurry return branch drilling fluid rheological monitoring device $R_1$; 91: downhole storage-type pressure measuring device; 92: gas-liquid separator exhaust pipe pressure sensor $P_{10}$; 93: manual gate valve $SV_{26}$; 94: manual gate valve $SV_{27}$; 95: manual gate valve $SV_{28}$; 96: feeder; 97: filling tank; 98: slurry suction pump; 99: mixer; 100: filling tank electrically controlled throttle valve $V_4$; 101: filling tank flowmeter $F_7$: 102: feeding control system; 103: slurry injection pipeline; 104: slurry suction pipeline; 105: high-precision drilling hydraulic calculation software.

DETAILED DESCRIPTIONS OF THE PREFERRED EMBODIMENTS

Embodiment 1

Figure 2:
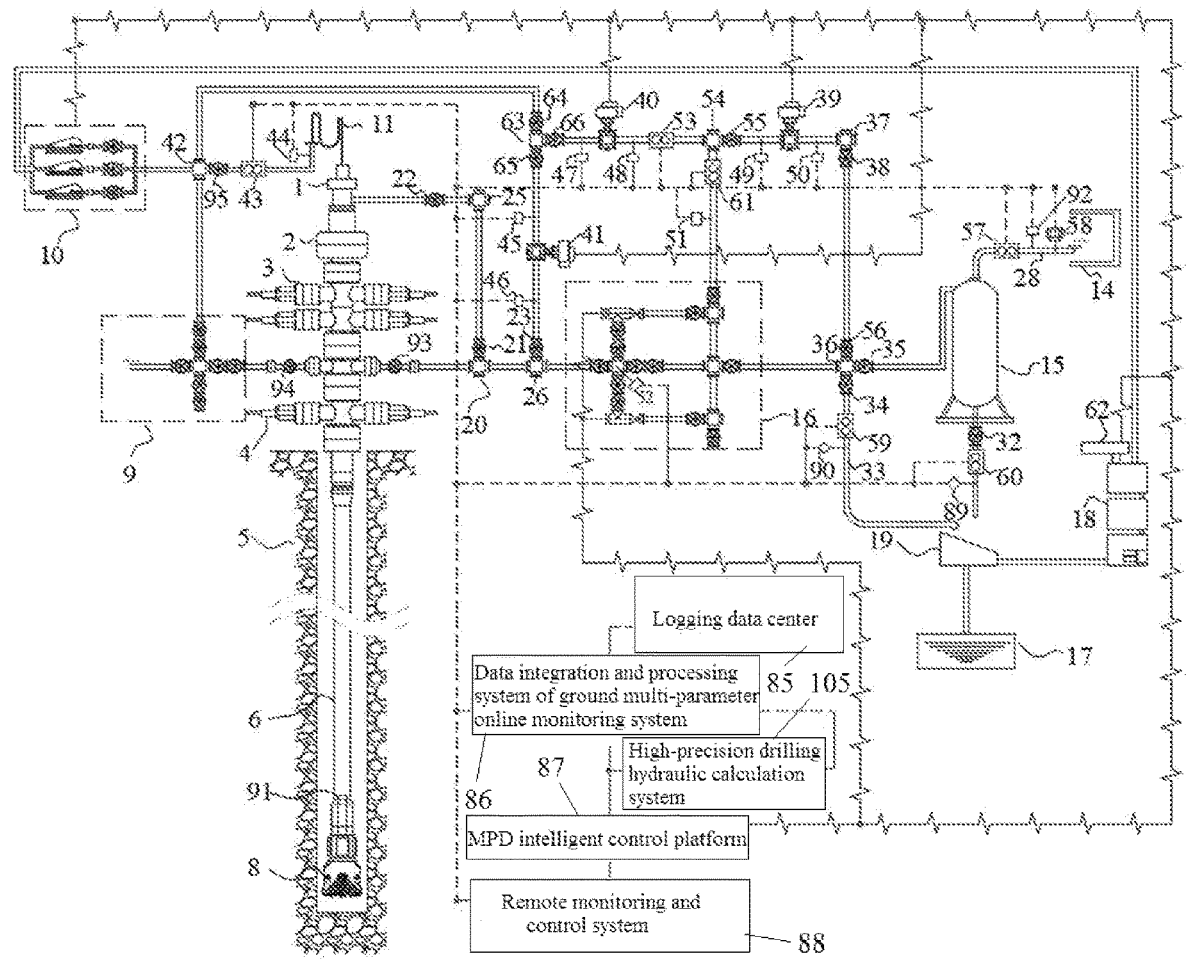
FIG. 2 is a schematic structural diagram of a remote intelligent active drilling pressure control system of the present invention.
Figure 3:
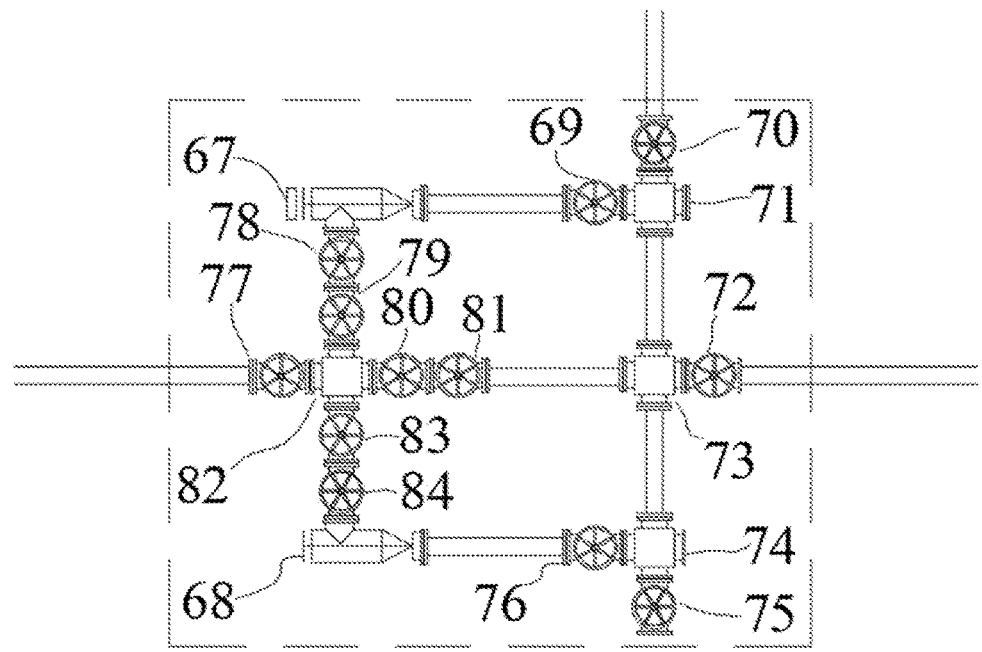
FIG. 3 is a schematic structural diagram of a well control throttle manifold.

FIG. 2 schematically shows a remote intelligent active drilling pressure control system according to an embodiment of the present invention.

As shown in FIG. 2, the remote intelligent active drilling pressure control system in this embodiment includes a ground multi-parameter online monitoring system, a rotary blowout preventer 1, a ground simple throttle control manifold, a wellhead back pressure compensation manifold, a graded filling device 62, a downhole storage-type pressure measuring device 91, a high-precision drilling hydraulic calculation system 105, an MPD intelligent control platform 87 and a remote monitoring and control system 88.

The remote intelligent active drilling pressure control system is not separately equipped with a gas-liquid separator, but makes use of a gas-liquid separator 15 standard equipped for a drilling team.

The ground multi-parameter online monitoring system includes a vertical pressure sensor $P_1$ 44, a pressure control manifold pressure sensor $P_2$ 45, a pressure control manifold pressure sensor $P_3$ 46, a pressure control manifold pressure sensor $P_4$ 47, a pressure control manifold pressure sensor $P_5$ 48, a pressure control manifold pressure sensor $P_6$ 49, a pressure control manifold pressure sensor $P_7$ 50, a pressure control manifold pressure sensor $P_8$ 51, a casing pressure sensor $P_9$ 52, a gas-liquid separator exhaust pipe pressure sensor $P_{10}$ 92, a drilling fluid inlet flowmeter $F_1$ 43, a drilling fluid outlet flowmeter $F_5$ 59, a gas-liquid separator outlet pipe flowmeter $F_4$ 60, a pressure control manifold flowmeter $F_2$ 53 and a pressure control manifold flowmeter $F_3$ 61, a gas-liquid separator exhaust pipe gas flowmeter $F_6$ 57, a slurry return branch drilling fluid rheological monitoring device $R_1$ 90, a gas-liquid separator outlet pipe drilling fluid rheological monitoring device $R_2$ 89, a gas-liquid separator exhaust pipe gas component monitoring device 58, and a ground multi-parameter online monitoring system 86.

The ground multi-parameter online monitoring system includes an integrated logging system, and a data acquisition and monitoring system that comes with a drilling rig itself, wherein data is derived from a logging data center 85.

In the ground multi-parameter online monitoring system, there are 10 pressure sensors; 6 flowmeters, including 5 liquid phase flowmeters and 1 gas phase flowmeter; at least one gas phase component monitoring device; and at least one drilling fluid rheological monitoring device.

The pressure sensors, the flowmeters, and the drilling fluid rheological monitoring device in the ground multi-parameter online monitoring system are not necessarily fully configured, which can be selected according to the specific operation modes on the site, or can also be fully configured; and corresponding necessary parameters can be collected according to the needs.

The gas component monitoring device 58 on an exhaust pipe of the gas-liquid separator shall at least be able to measure components and contents of three kinds of gases, i.e., hydrogen sulfide, methane, and carbon dioxide.

The sampling frequencies of respective parameter acquisition sensors in the ground multi-parameter online monitoring system are kept consistent, and can be adjusted according to a data sampling frequency of an on-site integrated logging system.

The data tested by the pressure sensors, the flowmeters, the component analysis device, the drilling fluid rheological monitoring device and the like are connected to the ground multi-parameter online monitoring system 86 through a wireless LAN. A wireless signal transmission module is mounted on each monitoring sensor, and a wireless signal receiving module is mounted on the ground multi-parameter online monitoring system 86.

The data integration and processing center of the ground multi-parameter online monitoring system is installed with data integration software, which can realize the preprocessing, storage and unified platform display of multi-source large-capacity data such as online monitoring data and logging data.

The ground multi-parameter online monitoring system 86 is provided with a port connected to a logging system, and is connected with the remote monitoring and control system 88 through communication network equipment. A sampling frequency of each monitoring device of the ground multi-parameter online monitoring system is consistent with a sampling frequency of the logging system. The ground multi-parameter online monitoring system 86 is connected with the high-precision drilling hydraulic calculation system and the MPD intelligent control platform 87.

A wireless communication mode for the ground multi-parameter online monitoring system 86 connected with the logging data center 85, all online monitoring sensors of the present invention, the MPD intelligent control center 87, and the remote monitoring and control system 88 adopts any one of TCP/IP, OPC or MODBUS communication protocols, with a data format conforming to a well site data transmission specification format.

The ground multi-parameter online monitoring system can provide core basic data for the remote intelligent active control of a wellbore pressure in oil and gas drilling.

Figure 4:
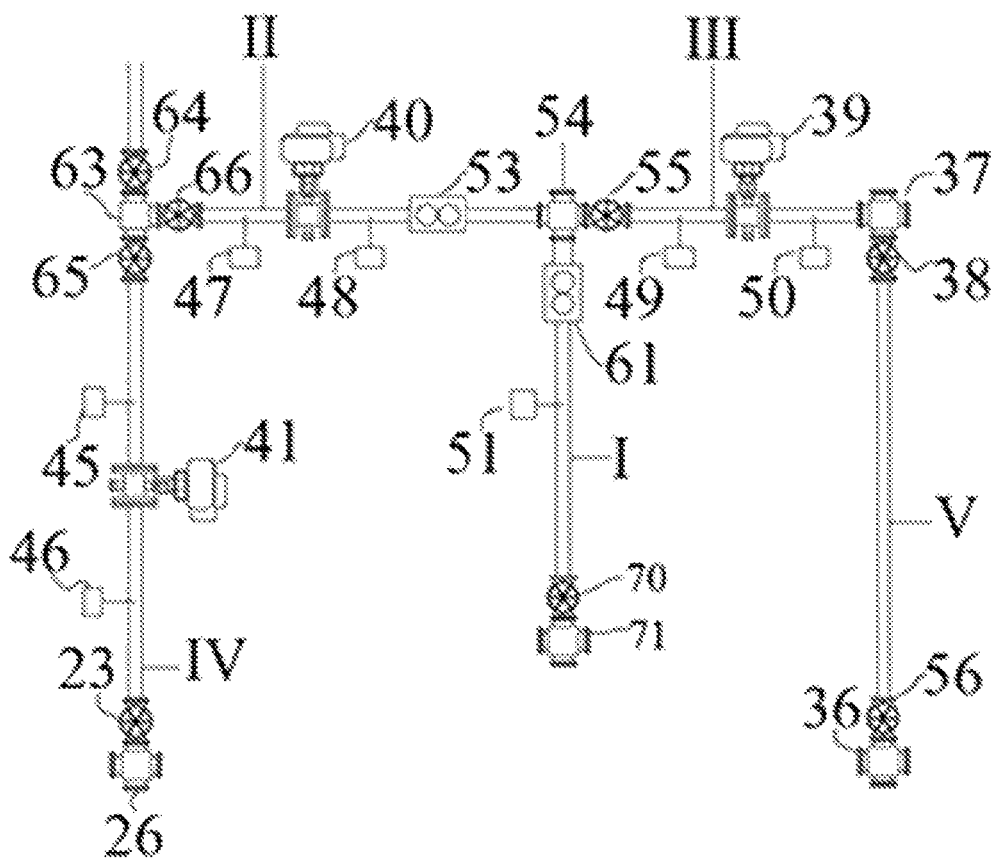
FIG. 4 is a schematic structural diagram of a throttling and diversion manifold system of the present invention.

As shown in FIG. 4, the ground simple throttle control manifold described in this embodiment includes a throttle guide manifold system, electrically controlled throttle valves, and gate valves. The throttle guide manifold system includes a branch I, a branch II and a branch III which are connected through a tee joint $T_6$ 54, a branch IV connected to the branch II through a tee joint $T_7$ 63, and a branch V connected to a four-way joint $SC_4$ 36 through a tee joint $T_4$ 37.

The branch I is equipped with a pressure control manifold flowmeter $F_3$ 61, a manual gate valve $SV_{15}$ 70, and a pressure control manifold pressure sensor $P_8$ 51, and connected to the well control throttle manifold 16 through a tee joint $T_8$ 71; the branch II is equipped with an electrically controlled manifold valve $V_2$ 40, a pressure control manifold flowmeter $F_2$ 53, a manual gate valve $SV_{13}$ 66, a pressure control manifold pressure sensor $P_4$ 47, and a pressure control manifold pressure sensor $P_5$ 48, and connected with the tee joint $T_7$ 63; the branch III is equipped with an electrically controlled throttle valve $V_1$ 39, a manual gate valve $SV_9$ 55, a pressure control manifold pressure sensor $P_6$ 49, and a pressure control manifold pressure sensor $P_7$ 50; the branch IV is equipped with manual gate valves $SV_3$ 23 and $SV_{12}$ 65, an electrically controlled throttle valve $V_3$ 41, and pressure control manifold pressure sensors $P_2$ 46 and $P_3$ 47, and connected to the well control throttle manifold 16 through a tee joint $T_4$ 26; and the branch V is equipped with a manual gate valve $SV_8$ 38 and a manual gate valve $SV_{10}$ 56, and connected to a drilling team gas-liquid separator 15 through a four-way joint $SC_4$.

Two pressure sensors are respectively mounted on both sides of each of the three electrically controlled throttle valves and configured to measure a throttle pressure drop of the corresponding electrically controlled throttle valve; the electrically controlled throttle valve is connected to the MPD intelligent control platform to achieve rapid regulation of the opening degrees, and the opening degrees can be regulated adaptively according to the throttle pressure drop.

The ground simple throttle control manifold described in the present invention is used to replace a ground automatic throttle control system 27 of the fine MPD system, and has two working modes of parallel connection and series connection with the well control throttle manifold 16, which can be switched by opening and closing the manual gate valve $SV_3$ 23, the hydraulically controlled throttle valve 67, and the manual gate valve $SV_{15}$ 70.

The manual gate valve $SV_3$ 23 and the manual gate valve $SV_{15}$ 70 are opened, the hydraulically controlled throttle valve 67 is closed, and the ground simple throttle control manifold is then connected in parallel with the well control throttle manifold 16. In the parallel connection mode, the well control throttle manifold 16 is in a closed state, and the throttle pressure control is performed by the ground simple throttle control manifold described in the present invention. At this time, in the ground simple throttle control manifold, the branch II, the branch III, the branch IV and the branch V have effective throttling effects, and the branch I is a closed branch in which no drilling fluid flows, and thus has no throttling effect.

The manual gate valves $SV_8$ 38, $SV_9$ 55, $SV_{12}$ 65, and $SV_{13}$ 66 on the ground simple throttle control manifold are in a normally opened state, and the electrically controlled throttle valves $V_1$ 39, $V_2$ 40, and $V_3$ 41 are also in a fully opened state under a non-pressure-controlled condition. The manual gate valves $SV_{14}$ 69, $SV_{19}$ 77, $SV_{20}$ 78, and $SV_{21}$ 79 on the well control throttle manifold are in a normally opened state, and the manual throttle valves $SV_{17}$ 75, $SV_{18}$ 76, $SV_{22}$ 80, $SV_{23}$ 81, $SV_{24}$ 83 and $SV_{25}$ 84 are also in a normally closed state.

Figure 7:
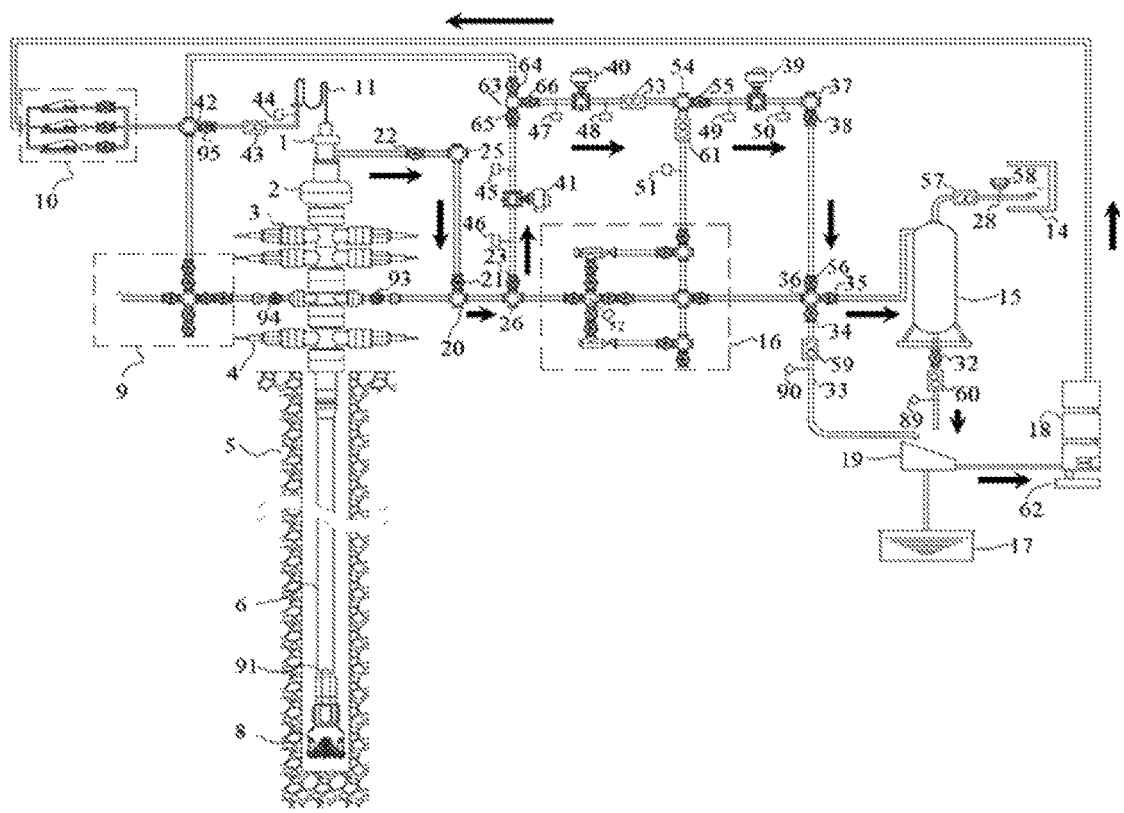
FIG. 7 is a schematic diagram of a flow path of drilling fluid when a ground simple throttle control manifold is connected in parallel with the well control throttle manifold in the present invention.

When the ground simple throttle control manifold is connected in parallel with the well control throttle manifold 16, a flow path of the drilling fluid is shown in FIG. 7. The specific path is as follows: the drilling fluid returns through the selected blowout preventer 1, enters the ground simple throttle control manifold through the manual gate valve $SV_1$ 22, the tee joint $T_3$ 25, the manual gate valve $SV_1$ 21, the tee joint $T_1$ 20 and the tee joint $T_4$ 26, sequentially flows through the branch IV, the branch II, the branch III and the branch V, and enters the gas-liquid separator 15 through the four-way joint $SC_4$ 36; and the separated drilling fluid flows through the vibrating screen 19, and then enters into a slurry tank 18 after solid control.

In the parallel connection mode, the three-stage throttle pressure control is realized through the electrically controlled throttle valve $V_3$ 41 on the branch IV, the electrically controlled throttle valve $V_2$ 40 on the branch and the electrically controlled throttle valve $V_1$ 39 on the branch, and the opening degrees of the three electrically controlled throttle valves are automatically controlled by the MPD intelligent control platform.

Further, the manual gate valve $SV_3$ 23 is closed, the manual gate valve $SV_{15}$ 70 and the hydraulically controlled throttle valve 67 are opened, and the ground simple throttle control manifold is then connected in series with the well control throttle manifold 16. In the series connection mode, in the ground simple throttle control manifold, the branch I, the branch III and the branch V have effective throttling effects, and the branch II and the branch IV are closed branches in which no drilling fluid flows, and thus have no throttling effect.

Figure 8:
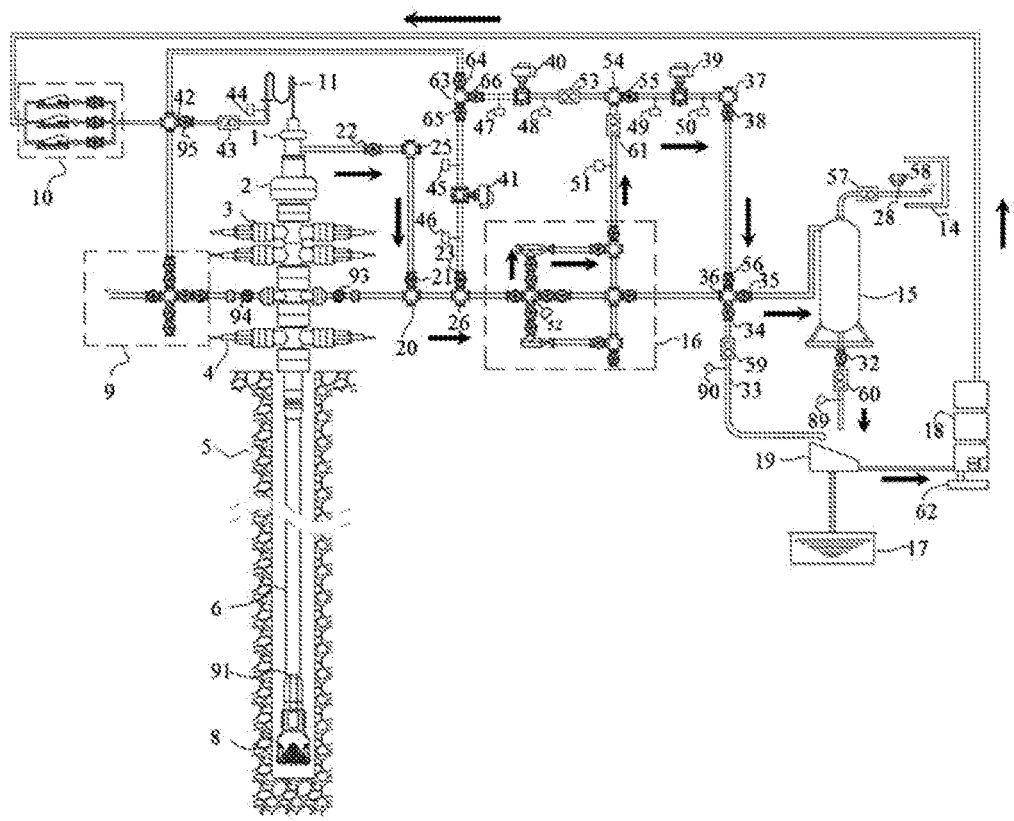
FIG. 8 is a schematic diagram of a flow path of the drilling fluid when the ground simple throttle control manifold is connected in series with the well control throttle manifold in the present invention.

When the ground simple throttle control manifold is connected in series with the well control throttle manifold 16, a flow path of the drilling fluid is shown in FIG. 8. The specific path is as follows: the drilling fluid returns through the selected blowout preventer 1, enters the well control throttle manifold 16 through the manual gate valve $SV_1$ 22, the tee joint $T_3$ 25, the manual gate valve $SV_1$ 21, the tee joint $T_1$ 20, the tee joint $T_4$ 26 and the manual gate valve $SV_{19}$ 77, enters the branch I of the ground simple throttle control manifold through the hydraulically controlled throttle valve 67 of the well control throttle manifold 16 and the tee joint $T_8$ 71, sequentially flows through the branch III and the branch V, and enters the gas-liquid separator 15 through the four-way joint $SC_4$ 36; and the separated drilling fluid flows through the vibrating screen 19, and then enters into the slurry tank 18 after solid control.

In the series connection mode, single-stage throttle pressure control can be achieved through the electrically controlled throttle valve $V_1$ 39 on the branch, and meanwhile, the hydraulically controlled throttle valve 67 on the well control throttle manifold can also be controlled to perform double-stage throttle pressure control. The opening degrees of the electrically controlled throttle valve $V_1$ 39 and the hydraulically controlled throttle valve 67 are automatically regulated by the MPD intelligent control platform.

The ground simple throttle control manifold of the present invention is mainly different from the prior art in that: a ground automatic throttle control system 27 of the existing fine MPD technology, which is composed of various gate valves, hydraulically controlled throttle valves (≥3), main throttle manifolds, auxiliary throttle manifolds, Coriolis flowmeters, pressure sensors, hydraulically controlled throttle control consoles, control boxes, and the like, adopts a skid-mounted structure as a whole, and is difficult to meet the application requirements in scenarios with limited well site spaces, such as mountain drilling and offshore drilling due to complete equipment structures and large occupied area; in addition, the standard equipped hydraulically controlled throttle valves, Coriolis flowmeters and other components are expensive, resulting in high cost of the whole set of ground automatic throttle control systems. The ground simple throttle control manifold described in the present invention is of a set of combined structure composed of manual gate valves, electrically controlled throttle valve pressure sensors, flowmeters and pipelines, and has the advantages of simple structure, flexible installation, no skid-mounted device, and small occupied area of equipment. In addition, in the ground simple throttle control manifold described in the present invention, the hydraulically controlled throttle valves are replaced with three electrically controlled throttle valves with relatively low cost, and the Coriolis flowmeter is replaced with a conventional liquid phase flowmeter, such that the equipment cost has been greatly reduced as a whole. It should be noted that although the maximum working pressure difference of a single electrically controlled throttle valve is lower than that of the hydraulically controlled throttle valve, the ground simple throttle control manifold realizes multi-stage throttle pressure control by means of the series connection (or parallel connection) of the three electrically controlled throttle valves or the series connection of one electrically controlled throttle valve and the well control throttle manifold, and has the overall pressure control capacity not weaker than the ground automatic throttle control system 27 in the prior art, thereby achieving a faster response speed of the electrically controlled throttle valves.

Figure 5:
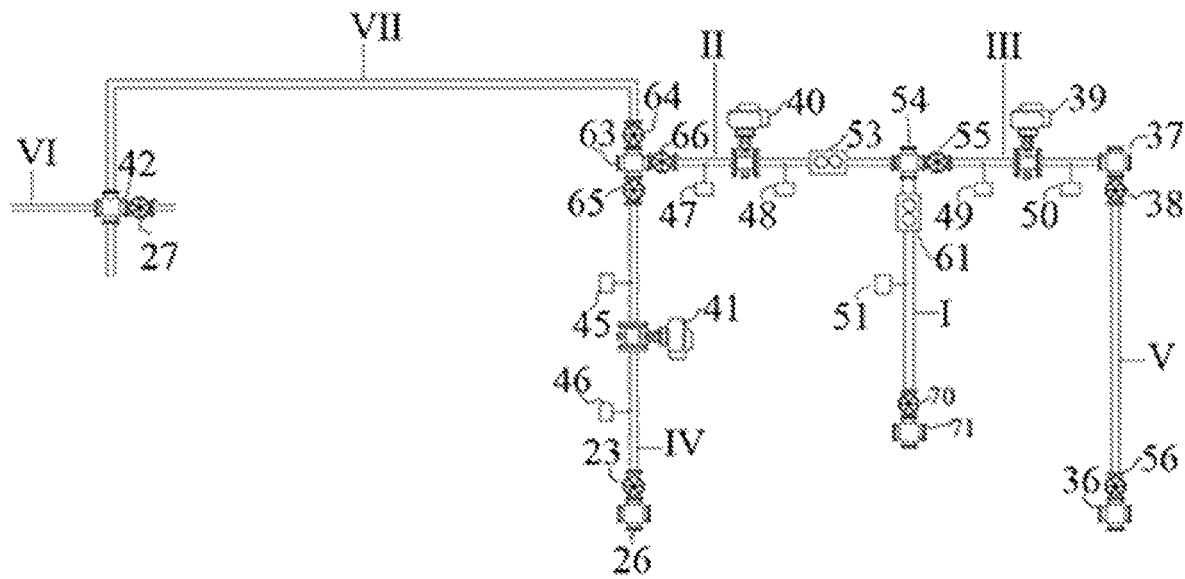
FIG. 5 is a schematic structural diagram of a back pressure diversion manifold of the present invention.

As shown in FIG. 5, the wellhead back pressure compensation manifold includes a slurry pump, an electrically controlled throttle valve, a back pressure diversion manifold, and a manual gate valve. The slurry pump is a drilling team slurry pump 10 which has no need to be equipped with a special back pressure pump, and can better meet a displacement requirement during slurry injection. The back pressure diversion manifold includes a branch VI which is connected with the slurry pump 10 through a four-way joint $SC_1$ 42, and a branch VII that connects the four-way joint $SC_1$ 42 and a tee joint $T_7$ 63; the branch VII is connected with the branch II, the branch III and the branch V of the ground simple throttle control manifold through the tee joint $T_7$ 63, and is connected with the vibrating screen 19 through the four-way joint $SC_4$ 36, or connected with the vibrating screen 19 through the four-way joint $SC_4$ 36 via the gas-liquid separator 15.

In comparison to FIG. 4 and FIG. 5, the wellhead back pressure compensation manifold and the ground simple throttle control manifold share the branch II, the branch III, the branch VI and the branch V. In practice, the wellhead back pressure compensation system is only additionally provided with the branch VI and the branch VII which connect the slurry pump 10 and the tee joint $T_7$ 63 on the ground simple throttle control manifold, thereby further simplifying the equipment configuration. The electrically controlled throttle valves and the pressure sensors included in the wellhead back pressure compensation system have been disposed on the branch II, the branch III and the branch IV on the ground simple throttle control manifold, without any additional configuration, including: the electrically controlled throttle valves $V_1$ 39, $V_2$ 40 and $V_3$ 41, and the pressure control manifold pressure sensors $P_2$ 46, $P_3$ 47, $P_4$ 47, $P_5$ 48, $P_6$ 49 and $P_7$ 50.

In a non-back-pressure compensation stage, the manual gate valve $SV_{11}$ 64 on the wellhead back pressure compensation manifold is closed. The back pressure compensation operation can be implemented just by opening the manual gate valve $SV_{11}$ 64 and closing the manual gate valve $SV_{28}$ 95. When a connection state of the ground simple throttle control manifold and the well control throttle manifold 16 changes, a flow path of the drilling fluid keeps unchanged, but a transmission path of the back pressure changes when the return pressure compensation operation is started.

Figure 9:
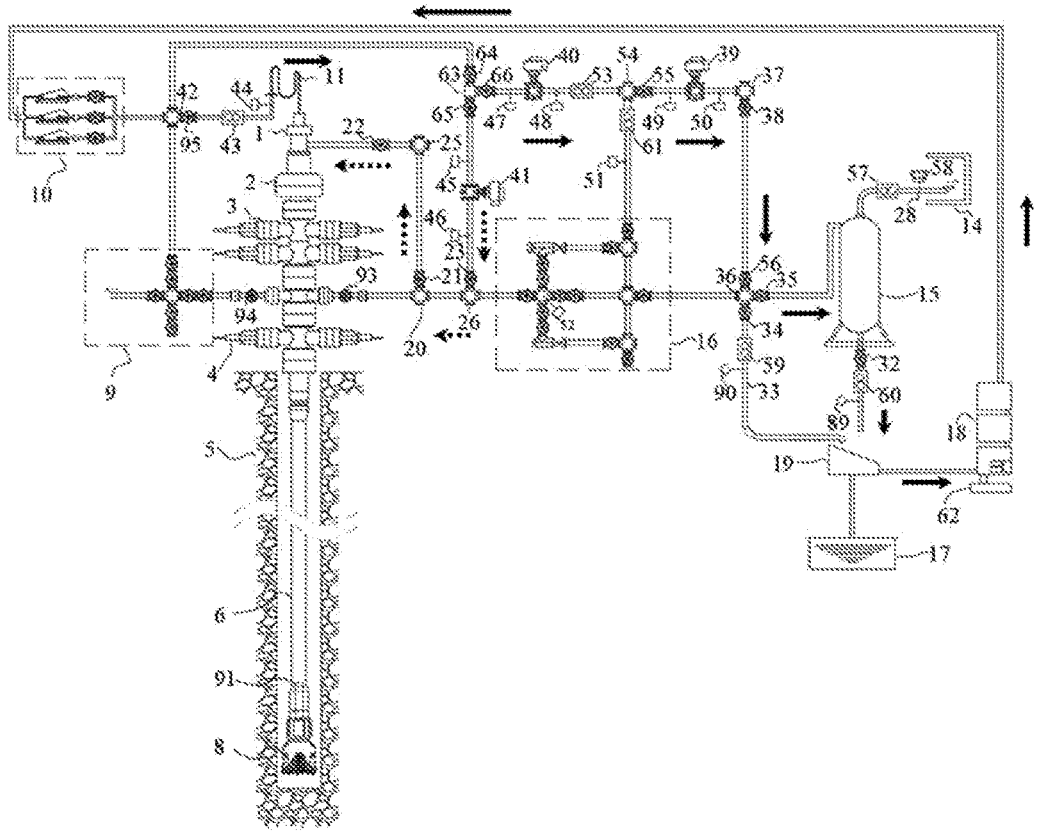
FIG. 9 is a schematic diagram of a flow path and a compensation back pressure transmission path of drilling fluid in a back pressure compensation manifold when the ground simple throttle control manifold is connected in parallel with the well control throttle manifold.
Figure 10:
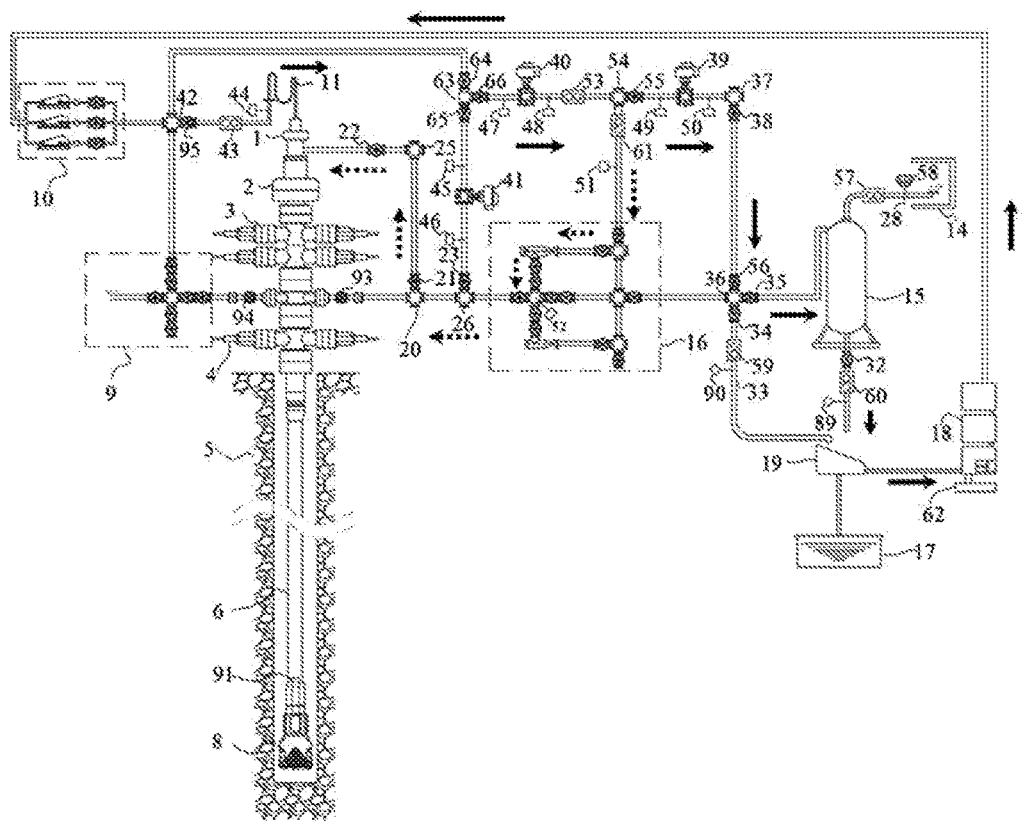
FIG. 10 is a schematic diagram of a flow path and a compensation back pressure transmission path of the drilling fluid in the back pressure compensation manifold when the ground simple throttle control manifold is connected in series with the well control throttle manifold.

As shown in FIG. 9 and FIG. 10, when the manual gate valve $SV_{11}$ 64 is opened for starting the back pressure compensation operation, a flow path of the drilling fluid is as follows: the drilling fluid enters the branch VII of the wellhead back pressure compensation manifold from the slurry pump 10 through the four-way joint $SC_1$ 42, sequentially flows through the branch II, the branch III and the branch V, and enters the gas-liquid separator 15 through the four-way $SC_4$ 36; and the separated drilling fluid flows through the vibrating screen 19, and then enters into the slurry tank 18 after solid control. As shown in FIG. 9, when the ground simple throttle control manifold is connected in parallel with the well control throttle manifold 16, the back pressure generated by the back pressure compensation manifold is applied by the rotary blowout preventer 1 to a wellbore along a pipeline sequentially through the branch IV and the tee joints $T_4$ 26, $T_1$ 20 and $T_3$ 25. As shown in FIG. 10, when the ground simple throttle control manifold is connected in series with the well control throttle manifold 16, the back pressure generated by the back pressure compensation manifold is applied by the rotary blowout preventer 1 to the wellbore sequentially through the branch I, the tee joint $T_9$ 71, the hydraulically controlled throttle valve 67, the four-way joint $SC_3$ 82, the manual gate valve $SV_{19}$ 77, and the tee joints $T_4$ 26, $T_1$ 20 and $T_3$ 25.

The back pressure of the wellhead back pressure compensation manifold is regulated by the electrically controlled throttle valves $V_1$ 39 and $V_2$ 40, the applied back pressure value is measured by a pressure sensor $P_9$ 52, and the opening degree of the electrically controlled throttle valve is automatically given by intelligent control software.

The wellhead back pressure compensation manifold of the present invention is mainly different from the prior art in that: the ground back pressure compensation device 12 of the existing fine MPD technology, which is composed of an electric three-plunger pump, an AC motor, a water supply pipeline, a water drainage pipeline, a Coriolis flowmeter, and the like, adopts a skid-mounted structure as a whole, and is difficult to meet the application requirements in scenarios with limited well site spaces, such as mountain drilling and offshore drilling due to complex equipment structures and large occupied area; in addition, the water feeding efficiency of the back pressure compensation device is not high, resulting in unstable outlet flow and difficulty to accurately control the wellhead back pressure; the frequent start and stop in field operations will also cause the failure of a frequency converter and a control system; and moreover, a motor rating of the back pressure compensation device is relatively large, such that the drilling team needs to be equipped with a 400 kW generator dedicated for power supply. The wellhead back pressure compensation manifold described in the present invention is composed of a drilling team slurry pump 10, electrically controlled throttle valves, a back pressure diversion manifold, manual gate valves, etc., wherein the back pressure diversion manifold is essentially just additionally provided with a diversion branch VI and a branch VII on the ground simple throttle control manifold, and shares the electrically controlled throttle valves and flowmeters with the ground simple throttle control manifold. The flow path of the drilling fluid is changed by opening and closing the manual gate valves, and the back pressure compensation is performed by means of the intelligent regulation of the electrically controlled throttle valves, and no skid-mounted device is needed, thereby achieving simple equipment structure, low cost and small occupied area. In addition, in the wellhead back pressure compensation manifold, the electric three-plunger pump is replaced with the drilling team slurry pump 10, without the need to be equipped with a special generator additionally, such that the problems of low displacement, low water feeding efficiency, more stable outlet flow, easy failure and the like are fundamentally solved, and the needs of slurry injection in large displacements can be met.

Figure 6:
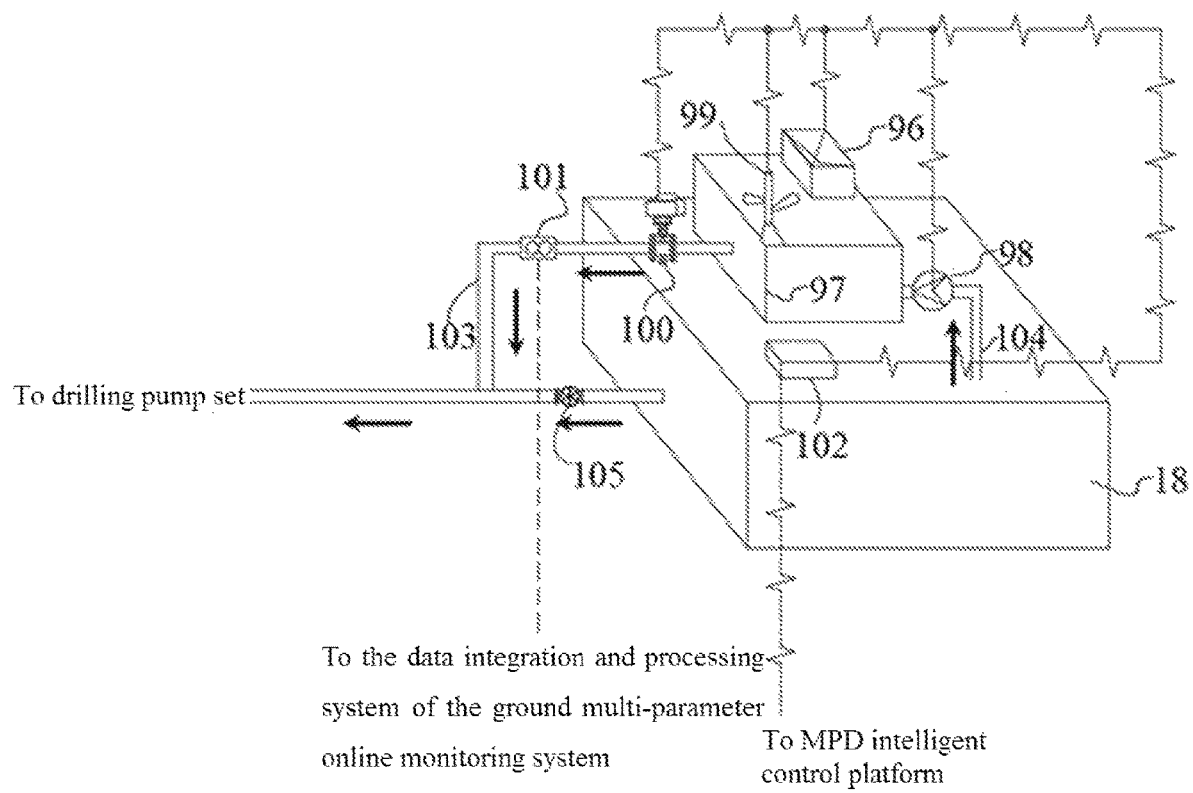
FIG. 6 is a schematic structural diagram of an automatic filling device for plugging materials in the present invention.

As shown in FIG. 6, the automatic filling device 62 for plugging materials in this embodiment includes a slurry suction pump 98, a filling tank 97, a feeder 96, a mixer 99, an electrically controlled throttle valve $V_4$ 100 on the filling tank, a feeding control system 102, a flowmeter $F_7$ 101, a slurry suction pipeline 104 and a slurry injection pipeline 103. As shown in FIG. 6, the filling tank 97 is mounted on the slurry tank 18, is connected with the slurry tank 18 through the slurry suction pipeline 104, and is connected with a water supply pipeline on the slurry pump through the slurry injection pipeline 103; the slurry suction pump 98 is mounted on the slurry suction pipeline 104; the electrically controlled throttle valve $V_4$ 100 on the filling tank and the flowmeter $F_7$ 101 are mounted on the slurry injection pipeline 103; and the mixer 99, the feeder 96 and the feeding control system 102 are mounted on the filling tank 97. The feeding control system 102 is connected with the mixer 99, the feeder 96 and the slurry suction pump 98, and is connected with the MPD intelligent control platform 87; and the MPD intelligent control platform 87 can automatically control operating parameters of opening, closing and rotational speeds, etc. of the mixer 99, the feeder 96 and the slurry suction pump 98.

The automatic filling device 62 for the plugging materials can realize the configuration and graded controllable injection of plugging slurry under the control of the MPD intelligent control platform 87, and its working principle is as follows:

if it is necessary to carry out the plugging operation, the electrically controlled throttle valve $V_4$ 100 is opened, and the slurry suction pump 98 sucks the drilling fluid in the slurry tank into the filling tank 97 through the slurry suction pipeline 104 under the control of the MPD intelligent control platform 87, and the plugging materials are added to the filling tank 97 through the feeder 96, and mixed evenly by the mixer 99. The feeder 99 can control a feeding speed of the plugging materials under the control of the MPD intelligent control platform 87, so as to ensure that the feeding uniformity of the plugging materials and the concentration of the plugging slurry in the filling tank 97 meet the requirements. The filling tank flowmeter $F_7$ 101 is used to measure a flow rate of the plugging slurry in the slurry injection pipeline, the flow rate in the injection of the plugging slurry is controlled by adjusting the opening degree of the electrically controlled throttle valve $V_4$ 100 on the filling tank, and the concentration of the plugging slurry pumped into the well is controlled by adjusting the displacement of the slurry pump.

The downhole storage-type pressure measuring device 91 is mounted in a drill collar at the upper part of a drill bit, and may be configured to measure and store downhole pressure and temperature data. The downhole storage-type pressure measuring device is mainly configured to correct a drilling hydraulic model used in the high-precision drilling hydraulic calculation system 105, and is not optional, i.e., can be determined whether to be installed according to actual situations. It is recommended to mount and test the downhole storage-type pressure measuring device in the first drilling pass of single drilling, but not mount in the subsequent passes.

The high-precision drilling hydraulic calculation system 105 is divided into two modules, i.e., a drilling fluid single-phase module and a gas-liquid two-phase module, to adapt to the requirements of different drilling flow conditions. The drilling hydraulic calculation software can meet the needs of different types of oil and gas wells such as straight wells, inclined wells, horizontal wells, and offshore drilling. The drilling hydraulic calculation software can take the changing characteristics of the density, rheology and the like of the drilling fluid over the temperature and pressure into account, and is suitable for water-based drilling fluid, oil-based drilling fluid and oil-in-water drilling fluid. The drilling hydraulic calculation software is a steady-state calculation model, which has a fast calculation speed and can complete a complete set of calculations within 2 s. The drilling hydraulic calculation software is connected with the ground multi-parameter online monitoring system 86 and the MPD intelligent control platform 87, and is configured to calculate a bottom hole pressure in real time according to the monitoring data provided by the ground online monitoring system 86, and transmit the bottom hole pressure to the intelligent control system 87 in real time, thereby providing basic data for its intelligent control. Steady-state calculation and transient calculation of the software are two main calculation modules.

The steady-state calculation module has a fast calculation speed, and the time required to complete a set of calculations is less than 1 second. The steady-state calculation module is used for flow calculations for the wellbore while drilling in the drilling process.

The steady-state calculation model includes two sets of calculation models, i.e., a drilling fluid single-phase flow model and a gas-liquid two-phase flow model. A Herschel-Bulckley model is used to calculate the drilling fluid single-phase flow. This model is suitable for both Bingham fluid and power-law fluid, and is also applicable to most types of drilling fluids. A Gucuyener model is used to calculate a nozzle pressure drop. The Herschel-Bulckley model has been demonstrated to have higher computational accuracy for flow calculations in deep and complex wells. In order to further improve the accuracy of steady-state hydraulic calculation, the dynamic changes in the density and rheology of the drilling fluid under a quasi-steady-state temperature field as well as high temperature and pressure are considered in the model. A Hasan-Kabir model is used for the quasi-steady-state temperature field, a Karstad-Aadnoy model is used for the drilling fluid density prediction at different temperatures and pressures, a Fisk-Jamision model is used for the drilling fluid flow prediction, and empirical coefficients in a drilling fluid density and rheological parameter prediction model are acquired by relevant experiments. A Petalas-Aziz mechanism model is used for gas-liquid two-phase flow calculation, and a Guo-Ghalambor model is adopted as a rock chip transport model.

The transient calculation model includes two sets of calculation models, i.e., a drilling fluid single-phase flow model and a gas-liquid two-phase flow model. The transient calculation only takes the gas production of a formation into an account, with the drilling fluid single-phase flow in a drill string and the gas-liquid two-phase flow in an annulus. The drilling fluid flow model in the drill string includes a one-dimensional continuity equation and a momentum equation of a liquid phase, wherein the flow model is calculated by using a Herschel-Bulckley model and iteratively solved by using a finite difference method. The gas-liquid two-phase fluid flow in the annulus is calculated by using a drift model, and solved by using a finite volume method, and the specific solution format adopts an AUSM+ format.

The steady-state calculation includes two calculation modules, wherein a calculation path of the calculation module I is as follows: taking flow parameters at an annulus outlet as an initial condition for calculation, the calculation starts from the annulus outlet to the well bottom along the annulus, through the drill bit, and iteratively up to a riser from the well bottom through a flow space inside the drill string. A calculation path of the calculation module II is as follows: taking flow parameters at an inlet as an initial condition for calculation, the calculation starts from a drill string inlet to the well bottom along a flow channel inside the drill string, through the drill bit, and iteratively up to the annulus outlet from the well bottom through the flow space of the annulus. If there is no gas production, the annulus and the drill string are both filled with the drilling fluid single-phase fluid, and a Herschel-Bulckley model is adopted for flow calculation. The data obtained by the module calculation I include: vertical depth, sounding depth, pressure (including hydrostatic column pressure, friction pressure drop, and cyclic dynamic pressure), temperature, drilling fluid flow rate, drilling fluid density, drilling fluid viscosity, as well as rock chip transfer velocity and rock chip concentration on the annulus path throughout the entire calculation path. If there is gas production, the drill string is filled with the drilling fluid single-phase fluid, and a Herschel-Bulckley model is used for flow calculation; and the annulus is filled with the gas-liquid two-phase fluid and Petalas-Aziz is used for flow calculation. The data obtained by the module calculation I includes: vertical depth, sounding depth, pressure (including hydrostatic column pressure, friction pressure drop, and cyclic dynamic pressure), temperature, drilling fluid flow rate, drilling fluid density, drilling fluid viscosity, as well as rock chip transfer velocity, rock chip concentration, gas-phase speed, gas-phase volume fraction and gas-phase density, and gas-liquid two-phase mixed density on the annulus path throughout the entire calculation path. All calculation data is stored in a database in real time and can be invoked at any time.

A calculation path of the transient calculation is as follows: taking flow parameters of the drilling fluid at the inlet as an initial condition for calculation, the calculation starts from the drill string inlet to the well bottom along a flow channel inside the drill string, through the drill bit, and iteratively up to the annulus outlet from the well bottom through the flow space of the annulus. The transient calculation only takes gas production conditions into account, wherein the drill string is filled with the drilling fluid single-phase fluid, and a Herschel-Bulckley model is used for flow calculation; and the annulus is filled with the gas-liquid two-phase fluid and Petalas-Aziz is used for flow calculation. The data obtained by the module calculation I include: vertical depth, sounding depth, pressure (including hydrostatic column pressure, friction pressure drop, and cyclic dynamic pressure), temperature, drilling fluid flow rate, drilling fluid density, drilling fluid viscosity, as well as rock chip transfer velocity, rock chip concentration, gas-phase speed, gas-phase volume fraction, gas-phase density, gas-phase drift velocity, liquid phase mass flow, and gas phase mass flow on the annulus path throughout the entire calculation path at each time node.

The high-precision drilling hydraulic calculation system 105 performs real-time calculation along the calculation path II by using the steady-state calculation module during the MPD operation. All the calculated data is stored in a database and can be invoked at any time. The bottom hole pressure is transmitted to the ground online monitoring system in real time, is presented on monitoring software in real time, and is used as an important basis for wellbore pressure control. The parameters required for calculation are derived from the ground online monitoring system, are automatically input into hydraulic calculation software in real time and are calculated in real time to obtain the bottom hole pressure. The required real-time data includes: drilling fluid inlet density, drilling fluid inlet temperature, drilling fluid rheological parameters, displacement, riser pressure, tool pressure drop (kill job generated by additional tools added to the drill string, such as tools for monitoring while drilling (MWD), rotary guide and acceleration in addition to the drill string and the drill collar, and the data is measured before entering the well), sounding depth and vertical depth. The remaining data (including a wellbore structure, a well trajectory, a drilling tool assembly, diameters and number of drill bit nozzles, and nozzle pressure drop) are pre-inputted into software before MPD drilling.

The calculation path I of the steady-state calculation module of the high-precision drilling hydraulic calculation system 105 is mainly used to correct and verify a model. Prior to the MPD operation, the calculation path I is selected by using adjacent well data or data of a drilled section of an operating well, and the calculated riser pressure is compared with a measured riser pressure, and then the model is verified and corrected. In the MPD operation, the calculation path I can also be artificially selected to perform on-site model correction according to the data of several drilled well sections of the operating well and time data. Further, the model can also be verified and corrected according to classical data from ground simulation experiments or literature reports.

The transient calculation module of the high-precision drilling hydraulic calculation system 105 is mainly used to simulate a gas-liquid two-phase flow state and a pressure evolution law of the annulus after gas cutting, so as to provide a basis for the control of the wellbore pressure. The transient flow calculation module is generally operated by expert technicians prior to MPD to perform a series of simulation calculations in order to develop a corresponding pressure control chart. Furthermore, the transient flow calculation module can also be initiated for model analysis at any time according to the needs of the technicians during the MPD operation.

The settings of the high-precision drilling hydraulic calculation system 105 are composed of a calculation module selection, a calculation path selection, a parameter input, a monitoring-while-drilling data interface, a calculation data output port, a calculation data display area, a data display option and a setting box, and a database. The monitoring-while-drilling data interface is connected with the data integration software of the ground online monitoring system, and the calculation data output port is connected with the monitoring software of the ground online monitoring system and the MPD intelligent control software.

The steady-state calculation module, the transient calculation module, the calculation path I and the calculation path II of the high-precision drilling hydraulic calculation system 105 are of independent operations and independent storage, without any interference with each other, and can operate at the same time.

Figure 11:
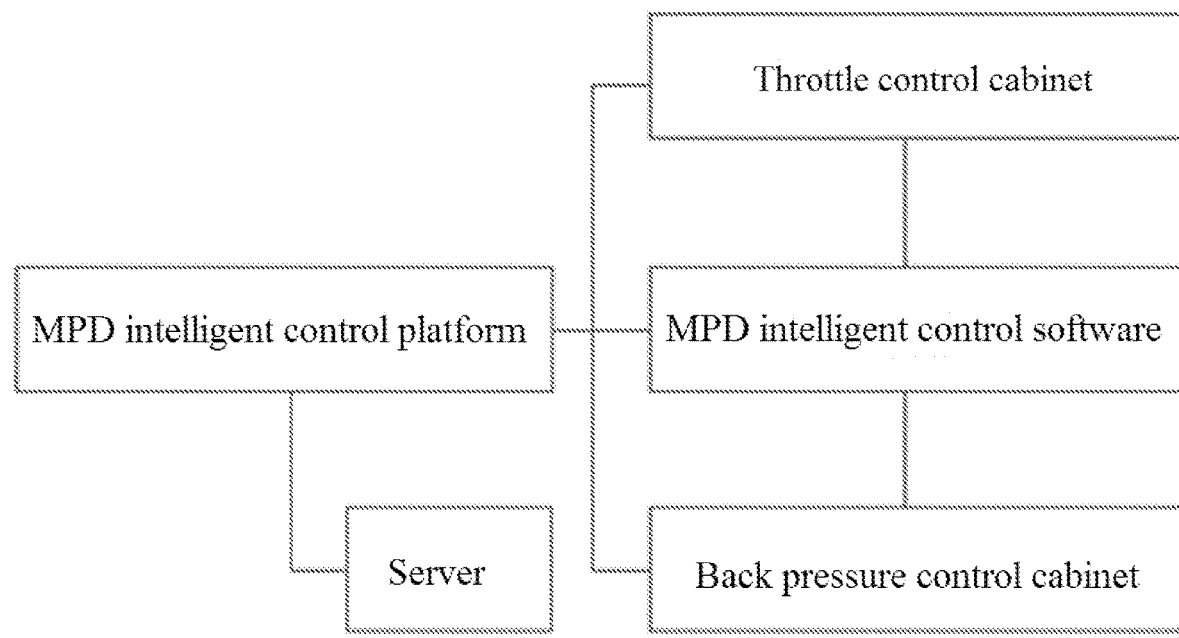
FIG. 11 is a composition diagram of an MPD intelligent control system of the present invention; and In drawings, reference symbols represent the following components.

As shown in FIG. 11, the MPD intelligent control platform 87 includes an MPD intelligent control software, a throttle control cabinet, a back pressure compensation control cabinet, and a server, and thus serves as a master control center of the MPD system.

The MPD intelligent control software is connected with the throttle control cabinet, and is connected with the ground simple throttle control system through the throttle control cabinet, thereby controlling the opening degree of the throttle control system, and an applied wellhead casing pressure. The throttle control cabinet is connected with the electrically controlled throttle valves $V_1$ 98, $V_2$ 40 and $V_3$ 41 and the hydraulically controlled throttle valve, and instructions for mounting the MPD intelligent control software are used to control the opening degrees of the respective electrically controlled throttle valves and the hydraulically controlled throttle valve.

Further, the MPD intelligent control software is connected with the back pressure compensation control cabinet, and is connected with the wellhead back pressure compensation manifold through the back pressure compensation control cabinet, thereby controlling the opening and closing of the back pressure compensation manifold and an applied wellhead back pressure. The back pressure compensation control cabinet is connected with the electrically controlled throttle valves $V_1$ 98 and $V_2$ 40, and instructions for mounting the MPD intelligent control software are used to control the opening degrees of the respective electrically controlled throttle valves.

The MPD intelligent control software is also connected with the ground multi-parameter online monitoring system 86 and the high-precision drilling hydraulic calculation system 105, and reasonable control instructions can be obtained in real time through a machine learning intelligent algorithm according to basic data collected by the MPD intelligent control software, and automatically transmitted to an actuator.

A machine learning intelligent algorithm may employ logistic regression, support vector machine, decision tree, neural network and other modes. A pressure regulation instruction sample library under multiple working conditions of MPD is established by collecting and sorting out basic data of different operation modes in the construction process of multi-well MPD construction in advance, the pressure regulation instruction sample library corresponding to regulation instructions issued by personnel (or pressure control equipment) under multiple working conditions. Using this sample library, a variety of compiled machine learning intelligent algorithms are learned and trained, algorithm parameters are adjusted, and the training effects are compared, thereby forming an optimal nonlinear mapping relationship between different working conditions and regulation instructions, or an optimal classification method. After completing the training, a set of determined "monitoring parameters-regulation instructions" algorithms is obtained as a training result. This set of algorithms can be embedded in MPD intelligent control software, such that an artificial pressure control decision can be reproduced or simulated according to online monitoring data during actual operation to achieve intelligent pressure control.

The MPD intelligent control software includes an intelligent control module and an artificial control module, which are independent of each other, do not interfere with each other, and can be artificially selected.

Further, the MPD intelligent control platform is also connected with the remote monitoring and control system.

As shown in FIG. 11, the remote monitoring and control system 88 includes a remote monitoring center, a data center, an expert workstation, a control center, and a server.

The remote monitoring center is connected with the MPD intelligent control platform through communication network equipment. The data center is configured to store all monitored data and all the data when the drilling has been performed, and to train an intelligent machine learning algorithm of the MPD intelligent control software. The expert workstation is equipped with a variety of engineering calculation and analysis software, accompanied by telecommuting of experts; and expert opinions and instructions can be directly transmitted to the MPD intelligent control software through the control center.

The remote intelligent active drilling pressure control system may also include a rotary blowout preventer 1 to achieve a more complete pressure control function, and may also include some other equipment, such as a derrick, a kill manifold, etc., to achieve various functions of drilling.

Embodiment 2

An embodiment of the present invention provides a remote intelligent active drilling pressure control method. The remote intelligent active drilling pressure control method is implemented by using the remote intelligent active drilling pressure control system. The method includes the following steps S1 to S4:

In S1, drilling parameters and engineering technical data are pre-inputted to the MPD intelligent control software prior to drilling.

The drilling parameters include a well category, a well type, a well depth, a well body structure, a well trajectory, a displacement, a drilling pressure, a rotational speed, formation lithology, drilling fluid density and viscosity, reservoir parameters and the like, and the pre-inputted data is derived from a drilling engineering design. The engineering calculation data includes formation's three-pressure profiles (pore pressure, collapse pressure, leakage loss pressure), fracture parameters (development degree, fracture density, fracture width, etc.), plugging parameters and the like, and the pre-inputted data is derived from, but not limited to the drilling engineering design and/or engineering calculation and analysis software (Petrel, Landmark, etc.).

Further, the high-precision drilling hydraulic calculation system 105 is pre-verified and model-corrected prior to drilling. The basic data used is derived from historical data stored in the data center of the remote monitoring and control system 88. It is necessary for software verification and model correction to select drilling foundation data of the same, or adjacent or similar blocks, and preferably select downhole measured data. The downhole measured data is derived from a storage-type pressure measuring device 91, or from PWD 7. The basic data may also be derived from, but not limited to indoor experimental data, field test data, etc.

In S2, modes of MPD construction operation, ground multi-parameter real-time monitoring, and intelligent identification operation are entered.

The pressure control of drilling can be divided into a pressure control mode and a non-pressure-control mode. The pressure control method described in the present invention is only applicable to the pressure control mode. The switching between the pressure control mode and the non-pressure-control mode is switched by opening and closing manual gate valves $SV_1$ 21, $SV_2$ 22, $SV_3$ 23, $SV_6$ 34, $SV_7$ 35, $SV_{10}$ 56, $SV_{11}$ 64, $SV_{15}$ 70, $SV_{16}$ 72, and $SV_{26}$ 93. The non-pressure-control mode is entered by closing the manual gate valves $SV_1$ 21, $SV_2$ 22, $SV_3$ 23, $SV_7$ 35, $SV_{10}$ 56, $SV_{11}$ 64, and $SV_{15}$ 70, and opening the manual gate valves $SV_6$ 34, $SV_{16}$ 72, and $SV_{26}$ 93. The manual gate valves $SV_5$ 32, $SV_8$ 38, $SV_9$ 55, $SV_{12}$ 65, $SV_{13}$ 66, $SV_{14}$ 69, $SV_{19}$ 77, $SV_{20}$ 78, $SV_{21}$ 79 and $SV_{28}$ 95 are in a normally opened state, and the manual throttle valves $SV_{17}$ 75, $SV_{18}$ 76, $SV_{22}$ 80, $SV_{23}$ 81, $SV_{24}$ 83, $SV_{25}$ 84 and $SV_{27}$ 94 are also in a normally closed state. In the non-pressure-control mode, the drilling fluid returns from a four-way wellhead, enters the well control throttle manifold 16 sequentially through the manual gate valve $SV_{26}$ 93 and $SV_{19}$ 77, flows through the vibrating screen 19 through the manual gate valve $SV_{16}$ 72, the four-way joint $SC_4$ 36 and the manual gate valve $SV_6$ 34, and then returns to the slurry tank 18. The pressure control mode can be entered by opening the manual gate valves $SV_1$ 21, $SV_2$ 22, $SV_3$ 23, $SV_7$ 35, $SV_{15}$ 70 and $SV_{10}$ 56 and closing the manual gate valves $SV_6$ 34, $SV_{11}$ 64, $SV_{16}$ 72 and $SV_{26}$ 93.

In the pressure control mode, the electrically controlled throttle valve $V_1$ 39 on the branch III of the ground simple throttle control manifold and the hydraulically controlled throttle valve 67 on the well control manifold are opened, the electrically controlled throttle valve $V_2$ 40 on the branch II and the electrically controlled throttle valve $V_3$ 41 on the branch IV are closed, and the ground simple throttle control manifold is connected in series with the well control throttle manifold 16. The circulating drilling fluid returns from a side outlet of the rotary blowout preventer 1, enters the ground simple throttle control manifold through the well control manifold 16, then sequentially flows through the branch I, the branch III and the branch V, enters the drilling team gas-liquid separator 15 through the four-way $SC_4$ 36 and the manual gate valve $SV_7$ 35, flows through the vibrating screen 19 and then returns to the slurry tank 18.

Further, in the pressure control mode, the ground simple throttle control manifold may also be connected in parallel with the well control throttle manifold 16, and the execution operations include: opening the electrically controlled throttle valves $V_1$ 39, $V_2$ 40, and $V_3$ 41 on the branch II, the branch III and the branch IV of the ground simple throttle control manifold, and closing the hydraulically controlled throttle valve 67. The circulating drilling fluid returns from the side outlet of the rotary blowout preventer 1, sequentially flows through the branch IV, the branch II, the branch III and the branch V of the ground throttle control manifold, enters the drilling team gas-liquid separator 15 sequentially through the four-way $SC_4$ 36 and the manual gate valve $SV_7$ 35, flows through the vibrating screen 19 and then returns to the slurry tank 18.

The two connection modes of the ground simple throttle control manifold can be switched to each other. The conversion process can be achieved just by regulating the electrically controlled throttle valves and the manual gate valves on the branches of the respective manifolds to be opened and closed, without the need to change the specific connection of the manifolds. The opening and closing of the electrically controlled throttle valves and the hydraulically controlled throttle valve 67 are controlled by the MPD intelligent control platform 87.

After entering the MPD construction operation, the ground multi-parameter online monitoring system 86 starts to collect monitoring data in real time. The turn-on and turn-off of the ground multi-parameter online monitoring system 86 can be performed individually or controlled by the MPD intelligent control platform 87. The data monitored by the ground multi-parameter online monitoring system 86 is automatically inputted into the high-precision drilling hydraulic calculation system 105 in real time, and the bottom hole pressure is calculated in real time. The calculation results are transmitted in real time to the MPD intelligent control platform 87 and the remote monitoring and control system 88 for real-time identification and intelligent control of the wellbore pressure. The turn-on and turn-off of the high-precision drilling hydraulic calculation system 105 are kept in consistency with the ground multi-parameter online monitoring system; and once the ground online monitoring system is turned on, the high-precision drilling hydraulic calculation system 105 is triggered to be turned on to perform real-time calculation. The high-precision drilling hydraulic calculation system 105 may also be turned on separately under the control of the MPD intelligent control platform 87.

Further, the drilling operation modes are divided into a normal drilling mode, a connection-making mode, a tripping-and-drilling mode and complex working modes. The complex working modes may also include a well leakage mode, and an overflow and well-kicking mode. Different operation modes are intelligently identified by the MPD intelligent control software based on the monitoring data of well depth, hook load, drilling pressure, rotational speed, vertical pressure, casing pressure, drilling fluid inlet/outlet density and flow, and gas measurement values of the ground multi-parameter online monitoring system, and supplemented by manual confirmation options.

In S3, a plugging operation while drilling is carried out to expand a "drilling safety density window" of a formation.

Prior to drilling into a leak-prone formation, an anti-leakage plugging agent while drilling is added into the pumped drilling fluid to enhance the pressure bearing capacity of the formation, increase a leakage loss pressure of the formation, prevent the well leakage, and expand the "drilling safety density window" of the formation. The selection and ratio of the leak-proof plugging agent while drilling need to be determined according to a leakage loss type of the leak-prone formation and corresponding fracture parameters (development degree, fracture density, fracture width, etc.). The determination of the relevant parameters can be calculated by engineering calculation and analysis software installed on the expert workstation of the remote monitoring and control system 88.

Further, the selection and ratio of the anti-leakage plugging agent while drilling can also be intelligently determined by the MPD intelligent control platform 87. The MPD intelligent control platform 87 intelligently and automatically retrieves construction data of similar formation drilling in the data center of the remote monitoring and control system, performs automatic match and identification, and gives recommended formulas and ratios.

Further, the multi-slug graded plugging operation in the case of well leakage is performed to effectively plug the formation so as to form a dense and high-strength plugging zone, thereby improving the leakage loss pressure of the formation and expanding the "drilling safety density window" of the formation.

The multi-slug graded plugging operation includes: grading plugging slurry according to the characteristics of formation fractures and particle sizes of plugging materials, and then injecting the plugging slurry into a wellbore in batches, so that the plugging materials enter the formation fractures in a graded and orderly manner to form a dense and effective plugging layer. In the multi-slug graded plugging operation, the large-particle plugging material injected first forms a bridge at a throat position of the fracture, the second-grade plugging material is sequentially injected for filling, and the third-grade plugging material injected last is supplemented to form a dense plugging layer.

Different from a conventional bridge plug plugging technology, different particle sizes and different types of plugging materials are mixed according to certain ratios and concentrations, and injected into the formation fractures together to form a plugging layer in the fractures. The multi-slug graded plugging process can make the plugging materials accumulated more orderly to form a denser plugging layer, thereby improving a plugging effect.

In the multi-slug graded plugging operation, a graded filling device 62 is required for the graded filling of the plugging materials. After the formation has a leakage loss, the MPD intelligent control platform 87 automatically identifies a well leakage condition in real time by using the data collected by the ground multi-parameter online monitoring system 86; and the MPD intelligent control software will send instructions to the graded filling device 62 in real time to perform the plugging operation according to preset plugging parameters prior to drilling.

In the multi-slug graded plugging operation, the plugging materials can be artificially filled in a graded manner.

Further, the MPD intelligent control software can also be configured to analyze parameters such as the widths of the fractures in the formation according to the leakage loss situation on site, intelligently give plugging parameters, and send the instructions to the graded plugging device 62 to perform the plugging operation. The relevant analysis is performed by the MPD intelligent control software to automatically invoke the engineering analysis software installed by the expert workstation of the remote monitoring and control system 88 according to on-site leakage loss data.

The invention claimed is:

1. An active intelligent wellbore pressure control system, comprising a ground multi-parameter online monitoring system (86), a rotary blowout preventer (1), a wellhead back pressure compensation manifold, an automatic plugging material filling device (62), a drilling device, an MPD intelligent control system (87), a remote monitoring and control system (88), and a high-precision hydraulic calculation system (105), wherein:
the ground multi-parameter online monitoring system (86) is provided with a port connected to a logging system, and connected to the remote monitoring and control system (88) through communication network equipment, the ground multi-parameter online monitoring system (86) is connected with the high-precision hydraulic calculation system (105) and the MPD intelligent control system (87), and the ground multi-parameter online monitoring system (86) provides core basic data for a remote intelligent active control of a wellbore pressure in oil and gas drilling; and
an upper end of the drilling device is connected to the wellhead back pressure compensation manifold; the wellhead back pressure compensation manifold is connected to one end of the automatic plugging material filling device (62) through a slurry pump (10), and the other end of the automatic plugging material filling device (62) is connected to a slurry tank (18); the slurry tank (18) is connected to a vibrating screen (19) through a pipeline; a slurry pool (17) is disposed below the vibrating screen (19); one end of the wellhead back pressure compensation manifold extends to an upper side of the slurry pool (17); one end of the wellhead back pressure compensation manifold is connected to a gas-liquid separator (15) through a pipeline; a combustion pool (14) is connected to an upper side of the gas-liquid separator (15); an lower side of the gas-liquid separator (15) is disposed above the vibrating screen (19); and the rotary blowout preventer (1) is disposed above the drilling device.

2. The active intelligent wellbore pressure control system according to claim 1, wherein the wellhead back pressure compensation manifold comprises a throttling and diversion manifold system, a four-way joint ($SC_1$ 42), a branch (VII), a branch (VI) and a slurry pump (10); the throttling and diversion manifold system is provided with a tee joint ($T_7$ 63); the branch (VII) is connected to the throttling and diversion manifold system and the four-way joint ($SC_1$ 42) through the tee joint ($T_7$ 63), and the branch (VI) is connected to the slurry pump (10) through the four-way joint ($SC_1$ 42); one end of the four-way joint ($SC_1$ 42) is connected to a water hose (11) through a pipeline, the water hose (11) is connected to the rotary blowout preventer (1), and an automatic throttle control system (27) and a manual gate valve ($SV_{28}$ 95) are disposed on the pipeline; the throttling and diversion manifold system comprises a PLC controller, electronically controlled throttle valves, gate valves, a branch (I), a branch (II), a branch (III), a branch (IV), and a branch (V); the branch (I), the branch (II) and the branch (III) are connected through a tee joint ($T_6$ 54); the branch (IV) is connected to the branch II through a tee joint ($T_7$ 63); the branch V is connected to the branch III through a tee joint ($T_5$ 37); the electronically controlled throttle valves and the gate valves are mounted in the throttling and diversion manifold system respectively; the gate valves comprise a manual gate valve ($SV_3$ 23), a manual gate valve ($SV_8$ 38), a manual gate valve ($SV_9$ 55), a manual gate valve ($SV_{10}$ 56), a manual gate valve ($SV_{12}$ 65), a manual gate valve ($SV_{13}$ 66), and a manual gate valve ($SV_{15}$ 70); the electronically controlled throttle valves comprise an electronically controlled throttle valve ($V_1$ 39), an electronically controlled throttle valve ($V_2$ 40) and an electronically controlled throttle valve ($V_3$ 41); the PLC controller is connected to the electronically controlled throttle valve ($V_1$ 39), the electronically controlled throttle valve ($V_2$ 40) and the electronically controlled throttle valve ($V_3$ 41) respectively;
a pressure control manifold flowmeter ($F_3$ 61), a manual gate valve ($SV_{15}$ 70) and a pressure control manifold pressure sensor ($P_8$ 51) are mounted on the branch (I); the manual gate valve ($SV_{15}$ 70) is connected with a well control throttle manifold (16) through a tee joint ($T_8$ 71); the ground multi-parameter online monitoring system (86) is respectively connected to the pressure control manifold flowmeter ($F_3$ 61) and the pressure control manifold pressure sensor ($P_8$ 51);
an electrically controlled throttle valve ($V_2$ 40), a pressure control manifold flowmeter ($F_2$ 53), the manual gate valve ($SV_{13}$ 66), a pressure control manifold pressure sensor ($P_4$ 47) and a pressure control manifold pressure sensor ($P_5$ 48) are mounted on the branch II; the manual gate valve ($SV_{13}$ 66) is connected with the tee joint ($T_7$ 63); the pressure control manifold pressure sensor ($P_4$ 47) and the pressure control manifold pressure sensor ($P_5$ 48) are respectively mounted on both ends of the electrically controlled throttle valve ($V_2$ 40); the ground multi-parameter online monitoring system (86) is respectively connected with the electrically controlled throttle valve ($V_2$ 40) and the pressure control manifold flowmeter ($F_2$ 53);
the electrically controlled throttle valve ($V_1$ 39) and the manual gate valve ($SV_9$ 55) are mounted on the branch (III); a pressure control manifold pressure sensor ($P_6$ 49) and a pressure control manifold pressure sensor ($P_7$ 50) are respectively mounted on both ends of the electrically controlled throttle valve ($V_1$ 39); the ground multi-parameter online monitoring system (86) is respectively connected with the electrically controlled throttle valve ($V_1$ 39), the pressure control manifold pressure sensor ($P_6$ 49) and the pressure control manifold pressure sensor ($P_5$ 50);
the manual gate valve ($SV_3$ 23), the manual gate valve ($SV_{12}$ 65), the electrically controlled throttle valve ($V_3$ 41), a pressure control manifold pressure sensor ($P_2$ 45) and a pressure control manifold pressure sensor ($P_3$ 46) are mounted on the branch (IV); the manual gate valve ($SV_3$ 23) is connected with the well control throttle manifold (16) through a tee joint ($T_4$ 26); the pressure control manifold pressure sensor ($P_2$ 45) and the pressure control manifold pressure sensor ($P_3$ 46) are respectively mounted on both ends of the electrically controlled throttle valve ($V_3$ 41); the ground multi-parameter online monitoring system (86) is respectively connected with the electrically controlled throttle valve ($V_3$ 41), the pressure control manifold pressure sensor ($P_2$ 45) and the pressure control manifold pressure sensor ($P_3$ 46); and the manual gate valve ($SV_8$ 38) and the manual gate valve ($SV_{10}$ 56) are mounted on the branch (V); and the manual gate valve ($SV_{10}$ 56) is connected with the gas-liquid separator (15) through a four-way joint ($SC_4$ 36).

3. The active intelligent wellbore pressure control system according to claim 1, further comprising a vertical pressure sensor ($P_1$ 44), a pressure control manifold pressure sensor ($P_2$ 45), a pressure control manifold pressure sensor ($P_3$ 46), a pressure control manifold pressure sensor ($P_4$ 47), a pressure control manifold pressure sensor ($P_5$ 48), a pressure control manifold pressure sensor ($P_6$ 49), a pressure control manifold pressure sensor ($P_7$ 50), a pressure control manifold pressure sensor ($P_8$ 51), a casing pressure sensor ($P_9$ 52), a gas-liquid separator exhaust pipe pressure sensor ($P_{10}$ 92), a drilling fluid inlet flowmeter ($F_1$ 43), a drilling fluid outlet flowmeter ($F_5$ 59), a gas-liquid separator outlet pipe flowmeter ($F_4$ 60), a pressure control manifold flowmeter ($F_2$ 53) and a pressure control manifold flowmeter ($F_3$ 61) which are connected through the ground multi-parameter online monitoring system (86), a gas-liquid separator exhaust pipe gas flowmeter ($F_6$ 57), a graded filling device slurry injection pipeline sensor ($F_7$ 101), a mud return branch drilling fluid rheological monitoring device ($R_1$ 90), a gas-liquid separator outlet pipe drilling fluid rheological monitoring device ($R_2$ 89), and a gas-liquid separator exhaust pipe gas component monitoring device (58).

4. The active intelligent wellbore pressure control system according to claim 2, wherein the wellhead back pressure compensation manifold is connected to a well-killing manifold (9) through a four-way ($SC_1$ 42), and one end of the well-killing manifold (9) is connected to a manual gate valve ($SV_{27}$ 94) disposed above the drilling device.

5. The active intelligent wellbore pressure control system according to claim 1, wherein the drilling device consists of a drill string (6) and a drill bit (8), a downhole storage-type pressure measuring device (91) is disposed above the drill bit (8), and a single-gate blowout preventer (4), a double-gate blowout preventer (3), an annular blowout preventer (2) and a rotary blowout preventer (1) are sequentially disposed above the drill bit (8).

6. The active intelligent wellbore pressure control system according to claim 1, wherein the automatic plugging material filling device (62) comprises a slurry suction pump (98), a filling tank (97), a feeder (96), a mixer (99), a filling tank electrically controlled throttle valve ($V_4$ 100), a filling control system (102), a filling tank flowmeter ($F_7$ 101), a slurry suction pipeline (104), and a slurry injection pipeline (103); the filling tank (97) is mounted on the slurry tank (18), and is connected with the slurry tank (18) through the slurry suction pipeline (104); the filling tank (97) is connected with a water pipeline on a drilling team slurry pump (18) through the slurry injection pipeline (103); the slurry suction pump (98) is mounted on the slurry suction pipeline (104); the filling tank electrically controlled throttle valve $V_4$ (100) and the filling tank flowmeter $F_7$ (101) are respectively mounted on the slurry injection pipeline (103); the mixer (99), the feeder (96) and the feeding control system (102) are respectively mounted on the filling tank (97); and the feeding control system (102) is respectively connected with the mixer (99), the feeder (96) and the slurry suction pump (98), and is connected with the MPD intelligent control system (87) through communication equipment.

7. The active intelligent wellbore pressure control system according to claim 1, wherein the high-precision drilling hydraulic calculation system comprises a steady-state calculation module and a transient calculation module:

the steady-state calculation module is configured to perform steady-state calculation on single-phase fluid or gas-liquid two-phase fluid of drilling fluid in an annulus and the drill string (6) according to a preset steady-state calculation path to obtain steady-state drilling parameters on the preset steady-state calculation path; and the transient calculation module is configured to perform transient calculation on the gas-liquid two-phase fluid in the annulus and the drill string (6) according to a preset transient calculation path to obtain transient drilling parameters on the preset transient calculation path.

* * * * *